United States Patent
Kiyama et al.

(10) Patent No.: US 9,170,118 B2
(45) Date of Patent: Oct. 27, 2015

(54) NAVIGATION SYSTEM FOR ELECTRIC VEHICLE

(71) Applicant: HITACHI, LTD., Tokyo (JP)

(72) Inventors: Noboru Kiyama, Tokyo (JP); Keisuke Shirai, Tokyo (JP); Satoshi Shirasawa, Tokyo (JP); Tatsuaki Osafune, Tokyo (JP); Yuki Horita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 34 days.

(21) Appl. No.: 14/065,478

(22) Filed: Oct. 29, 2013

(65) Prior Publication Data

US 2014/0163877 A1   Jun. 12, 2014

(30) Foreign Application Priority Data

Dec. 7, 2012   (JP) .................................. 2012-267769

(51) Int. Cl.
*G01C 21/34* (2006.01)
*G01C 21/36* (2006.01)

(52) U.S. Cl.
CPC ........ *G01C 21/3469* (2013.01); *G01C 21/3697* (2013.01)

(58) Field of Classification Search
CPC ......................... G01C 21/3469; G01C 21/3697
USPC ................................................. 701/533, 537
See application file for complete search history.

(56) References Cited

U.S. PATENT DOCUMENTS

| | | | |
|---|---|---|---|
| 2008/0035853 A1 | 2/2008 | Doering et al. | |
| 2008/0319597 A1 | 12/2008 | Yamada | |
| 2012/0109519 A1* | 5/2012 | Uyeki | 701/439 |
| 2012/0136574 A1* | 5/2012 | Kobayashi et al. | 701/533 |
| 2014/0052373 A1* | 2/2014 | Hoch et al. | 701/533 |

FOREIGN PATENT DOCUMENTS

| | | |
|---|---|---|
| EP | 2 600 106 A1 | 6/2013 |
| JP | 2007-050888 A | 3/2007 |
| JP | 2007-534124 A | 11/2007 |
| JP | 2012-211888 A | 11/2012 |
| JP | 2013-085449 A | 5/2013 |
| WO | 2012/014615 A1 | 2/2012 |

* cited by examiner

*Primary Examiner* — Nga X Nguyen
(74) *Attorney, Agent, or Firm* — Volpe and Koenig, P.C.

(57) ABSTRACT

A navigation system for an electric vehicle includes a telematics center, a display terminal, and a charging station. In response to a request from the display terminal, the telematics center sends a route search result, which is created based on information on an electric vehicle and the charging station and which includes base point information whose remaining battery capacity is to be confirmed, to the display terminal. The display terminal displays route guidance information, the current position, and a result of comparison between the current remaining battery capacity and the base point information to the user who is driving the electric vehicle.

7 Claims, 18 Drawing Sheets

| USER ID | LAST ACQUISITION DATE/TIME | LATEST POSITION INF | USAGE STATUS |
|---|---|---|---|
| EVU1 | 2012/06/08 12:34:56 | (35.1234,135.1234) | NAVIGATION IN PROGRESS |
| EVU22 | 2012/06/08 10:29:38 | (34.9876,134.9876) | - |
| ... | ... | ... | ... |

601  602  603

220

610

| CSID | POSITION INF | TYPE | POWER OUTPUT | CONNECTOR SHAPE | AVAILABILITY INF | LAST ACQUISITION DATE/TIME |
|---|---|---|---|---|---|---|
| 2003 | (35.1239,135.6712) | RAPID CHARGING | 50kWh | CH TYPE | FULL (15 MINUTES) | 2012/06/08 12:34:56 |
| 4018 | (35.6709,135.3785) | NORMAL CHARGING | 3kWh | 200V TYPE | EMPTY | 2012/06/08 10:29:38 |
| ... | ... | ... | ... | ... | ... | ... |

Table 223:

| | 701 | 702 | 703 | 704 | 705 |
|---|---|---|---|---|---|
| PROBE ID | ROAD LINK ID | PASSAGE TIME | PASSAGE-TIME REMAINING BATTERY CAPACITY | PASSAGE-TIME ELECTRIC MILEAGE | LAST-TRANSIT CSID |
| 2003 | 134 | 2012/06/08 12:34:56 | 3.4kWh | 4km/kWh | 127 |
| 4018 | 4934 | 2012/06/08 10:29:38 | 4.8kWh | 4.1km/kWh | - |
| ... | ... | ... | ... | ... | ... |

(700 labels PROBE ID column)

Table 224:

| 710 | 711 | 712 | 713 | 714 | 715 | 716 |
|---|---|---|---|---|---|---|
| ROAD LINK ID | POSITION INF 1 | POSITION INF 2 | TRAVELING TIME | TRAVELING DISTANCE | REQUIRED BATTERY AMOUNT | ROAD NAME |
| 134 | (35.1239,135.6712) | (35.1241,135.6728) | 3min | 4.8km | 0.5kWh | ROUTE XX |
| 4934 | (35.6709,135.3785) | (35.6684,135.3699) | 2min | 3.2km | 0.6kWh | EXPRESSWAY YY |
| ... | ... | ... | ... | ... | ... | ... |

| I/S ID (1001) | POSITION INF (1002) | ESTIMATED TRAVELING DISTANCE (1003) | ESTIMATED TRAVELING TIME (1004) | ESTIMATED REMAINING BATTERY CAPACITY (1005) | GUIDING INF (1006) |
|---|---|---|---|---|---|
| 134 | (35.1239,135.6712) | 0.2km | 3min | 18.4kWh | TURN RIGHT |
| 4934 | (35.6709,135.3785) | 1.8km | 10min | 17.6kWh | CONTINUE STRAIGHT ON |
| ... | ... | ... | ... | ... | ... |

1010

| CHECKPOINT ID (1011) | POSITION INF (1012) | REMAINING BATTERY CAPACITY UPPER LIMIT (1013) | REMAINING BATTERY CAPACITY LOWER LIMIT (1014) | ESTIMATED TRAVELING DISTANCE FROM STARTING POINT (1015) | ESTIMATED TRAVELING TIME FROM STARTING POINT (1016) |
|---|---|---|---|---|---|
| 1 | (35.1239,135.6712) | 19.6kWh | 16.4kWh | 0.2km | 3min |
| 2 | (35.6709,135.3785) | 18.8kWh | 15.6kWh | 2.0km | 13min |
| ... | ... | ... | ... | ... | ... |

NAVIGATION SYSTEM FOR ELECTRIC VEHICLE

INCORPORATION BY REFERENCE

The present application claims priority from Japanese application JP2012-267769 filed on Dec. 7, 2012, the content of which is hereby incorporated by reference into this application.

BACKGROUND OF THE INVENTION

The subject disclosed herein relates to a navigation service for an electric vehicle.

Recently, automobile manufacturers are actively engaged in the development and marketing of an electric vehicle (EV, with any number of wheels) that travels using electric power stored in-vehicle batteries. Unlike a conventional gasoline-powered vehicle, an electric vehicle does not use fossil fuel. In addition, an electric vehicle can use a power generation method, such as atomic power generation or solar energy generation, that emits less carbon dioxide. Therefore, switching from a gasoline-powered vehicle to an electric vehicle is an effective countermeasure against global warming and fossil fuel exhaustion. This prompts the governments of various nations of the world, including Japan, Europe, and America, to adopt tax reduction systems or subsidy systems for the diffusion of electric vehicles.

However, the distance (cruising range) over which an electric vehicle can travel with one charging of the batteries is about 200 km that is shorter than that of a gasoline-power vehicle. This means that the driver of an electric vehicle must visit charging stations, which correspond to the gas stations of a gasoline-power vehicle, more frequently when traveling long distances.

Charging stations are classified roughly into two types: normal charging station and rapid charging station. Although widely available, a normal charging station requires four to eight hours for one charging. Therefore, a normal charging station is unsuitable for a charging facility that is used away from home. On the other hand, though one charging requires only 30 minutes, a rapid charging station is not widely used today because it requires a special facility that is very expensive.

For the reasons described above, an electric vehicle user, who is planning to travel to a distant location, must be careful about the remaining battery capacity and the charging station locations during traveling. These worries may prevent an electric vehicle from becoming popular.

To solve these problems, efforts are being made to increase the capacity of the in-vehicle batteries and to increase the number of charging facilities. At the same time, to compensate for the shortcomings described above, the study has been conducted on the telematics service that works with a navigation system mounted in an electric vehicle.

For example, JP-A-2012-211888 proposes a terminal that informs the user about the requirement of charging and the charging stations available on a route. More specifically, this terminal displays a bar graph, the left end of which corresponds to the current position and which has a length corresponding to the maximum battery charging capacity, for displaying the battery remaining capacity of the electric vehicle. On this bar graph, the terminal displays the current remaining battery capacity, the battery capacity required to reach the destination, the shortage of battery capacity that is the difference the two, and the charging stations to which the vehicle can reach with the current remaining battery capacity (Paragraphs 0051 to 0055).

SUMMARY OF THE INVENTION

According to the conventional technology, a route is changed to prevent the battery of an electric vehicle from running out (out of power condition), for example, by searching for a route on which charging stations are available or by changing a route to another route on which the battery consumption is low.

However, because the left end of the bar graph corresponds to the current position, the problem with the technology disclosed in JP-A-2012-211888 is that the user who is driving an electric vehicle cannot determine whether the electric vehicle has been traveling smoothly as expected at the time of scheduling (or at the time of last charging). This makes the user feel uneasy.

Another problem is that the user also feels uneasy about the navigation that changes a route search because sufficient information is not provided for the reason for changing the route.

Eco-driving refers to driving that contributes to cost saving in electricity. This is achieved by saving power consumption, for example, by increasing the pre-set temperature of an air conditioner during the summer and decreasing it during the winter, withholding the use of peripheral apparatuses such as audiovisual apparatuses, and avoiding quick acceleration, or by increasing the amount of electric power generation by avoiding quick deceleration and using the regenerative brake.

The technology disclosed in this specification relates to a navigation system that informs the user whether the current remaining battery capacity of an electric vehicle is within the range assumed by the route guidance being carried out.

The disclosed system is characterized in that, for the route search result, base point information is calculated as a point, at which the remaining battery capacity is confirmed, according to the relation between the remaining battery capacity and the position of a charging station. The base point information includes the position information as well as the information on the upper limit and the lower limit on the remaining battery capacity to be reserved when the vehicle passes the point.

In the disclosed system, when an electric vehicle starts traveling based on an actual route search result, a terminal that performs the navigation function repeatedly compares the position and the remaining battery capacity at that time with the base point information described above. Before the electric vehicle passes a base point, the system displays the estimated information that will be generated when the electric vehicle passes the base point.

When the electric vehicle passes a base point, the system displays the information indicating the comparison between the upper and lower limits of the estimated remaining battery capacity and the actual remaining battery capacity. In addition, when the actual remaining battery capacity of the electric vehicle is higher than the estimated upper limit value or lower than the lower limit value, the system performs the route research.

A specific embodiment is a navigation system for an electric vehicle, the navigation system including a display terminal that sends and receives information to and from an electric vehicle over a network; and a server that sends and receives information to and from the display terminal over the network, wherein the display terminal performs processing for sending a search request for a route, via which the electric vehicle moves from a starting point to a destination, to the server, the search request including position coordinates of the starting point, position coordinates of the destination, a remaining battery capacity, a battery capacity, and a start time; processing for displaying route guidance information on an output device, the route guidance information sent from the server, the route guidance information created based on a route search result that includes one or more pieces of base point information; and processing for displaying, on the output device, a result of comparison between an estimated remaining battery capacity at a battery state confirmation point, which is included in one of the pieces of the base point information, with a confirmation-point remaining battery capacity of the electric vehicle at the confirmation point and the server performs processing for searching for a route, via which the electric vehicle moves from the starting point to the destination without battery exhaustion, in response to the route search request from the display terminal;

processing for deriving one or more pieces of the base point information on the searched-for route and for adding the derived base point information to the route search result, the base point information including position information on the confirmation point and a confirmation-point remaining battery capacity at the confirmation point; and processing for sending the route search result, which includes the derived base point information, to the display terminal.

The server performs processing for setting a position on the searched-for route as the confirmation point, the position being dependent on a time, a distance, a power consumption, or intersection point information.

Another specific embodiment is a display terminal that sends and receives information to and from an electric vehicle over a network, the display terminal performing:

processing for managing by associating a position, a type, and an output power of a charging station with an identifier that can uniquely identify the charging station; processing for managing road information for use in a route search; processing for searching for a route via which the electric vehicle moves from a starting point to a destination without battery exhaustion based on acquired position coordinates of the starting point, position coordinates of the destination, a remaining battery capacity, a battery capacity, and a start time; processing for setting a position on a searched-for route as a battery state confirmation point, the position being dependent on a time, a distance, a power consumption, or position information on an intersection, and for deriving one or more pieces of base point information that includes position information on the confirmation point and a confirmation-point remaining battery capacity at the point; and processing for confirming a remaining battery capacity of the electric vehicle and for displaying, on a output device, a result of comparison between an estimated remaining battery capacity at the confirmation point included in one of the pieces of the base point information and a confirmation-point remaining battery capacity of the electric vehicle at the confirmation point.

According to the above embodiments, the user who is driving an electric vehicle can easily determine whether the vehicle is traveling as scheduled in a scheduled route using the current remaining battery capacity at the current position.

When changing a route for preventing battery exhaustion, the system presents information on a charging station on a new route in advance as the base point information, eliminating the worry about the reason for changing the route.

When eco-driving is performed by the user more efficiently than is indicated by the route search result, the system evaluates the eco-driving and allows the user to re-search for a better route. This leads to an increase in service quality for electric vehicle users.

The technology disclosed in this specification provides an electric vehicle service that gives the user a sense of security.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing an example of a user information DB and a charging station information DB processed by the telematics center.

FIG. 7 is a diagram showing an example of a probe information DB and a road link information DB processed by the telematics center.

FIG. 10 is a diagram showing an example of route search results obtained by the route search processing at the telematics center.

DESCRIPTION OF THE EMBODIMENTS

Embodiments are described below with reference to FIG. 1 to FIG. 18.

Figure 1:
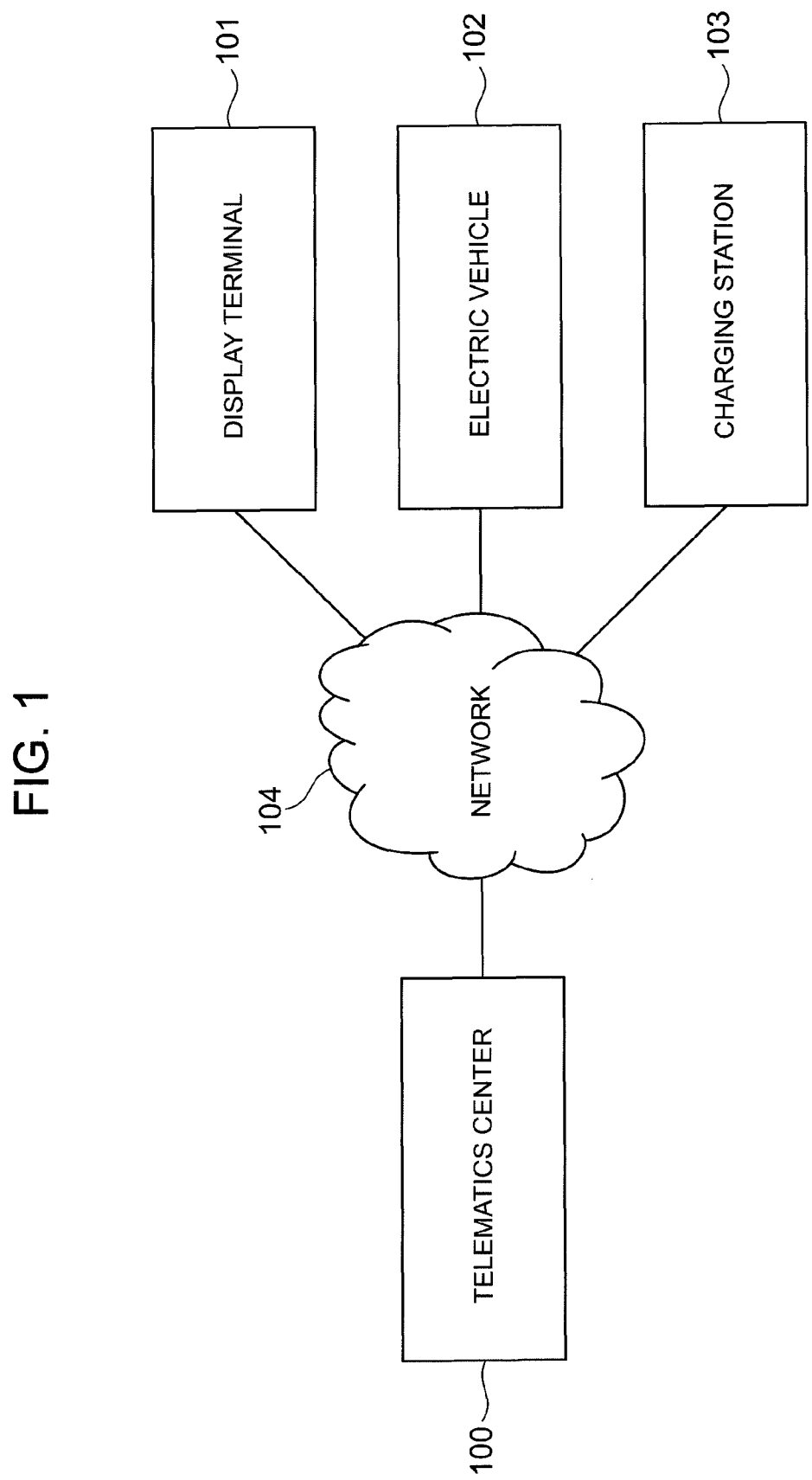
FIG. 1 is a diagram showing an example of the general configuration of a navigation system for an electric vehicle.

FIG. 1 is a diagram showing an example of the configuration of a navigation system for an electric vehicle disclosed in this embodiment.

An electric vehicle described in this specification is a vehicle that uses electricity, stored in the chargeable secondary batteries, as the energy source and rotates the motor with the electricity to generate power for traveling. The electric vehicle may have any number of wheels.

The system includes a telematics center device (hereinafter called a server or a telematics center) 100 that is a server device for collecting and processing information (INF), a display terminal 101 that accepts a user input and displays a map, the locations of charging stations, route search results, and navigation information on the screen, and a charging station 103 that charges an electric vehicle 102. These components are interconnected over a network 104.

The network 104 is a mobile phone network, the Internet, or a short-range wireless communication such as a LAN, or a network composed of a combination of these networks.

Figure 2:
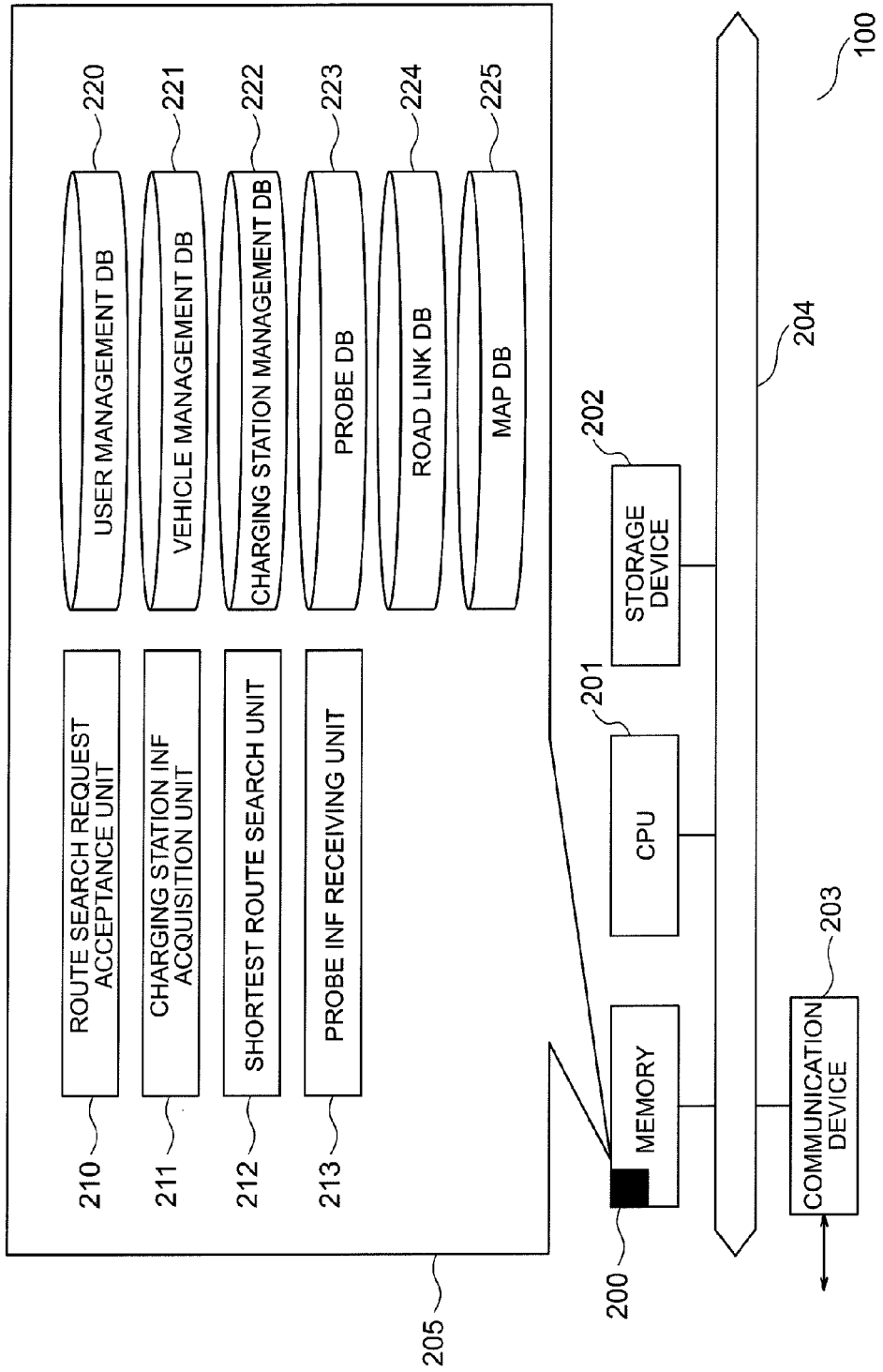
FIG. 2 is a diagram showing an example of the internal configuration of a telematics center.

FIG. 2 is a diagram showing an example of the internal configuration of the telematics center 100.

The telematics center 100 includes a memory 200 to or from which the CPU writes and reads data during program execution, a CPU 201 that executes a program, read into the memory 200, for performing the processing described below, a storage device 202 such as a hard disk in which a navigation information generation program 205 is stored, a communication unit 203 that communicates with the display terminal 101 or other devices over the network 104, and an internal communication line 204 such as a bus via which the modules are connected.

The navigation information generation program 205 includes programs that implement a route search request acceptance unit 210, a charging station information acquisition unit 211, a shortest route search unit 212, and a probe information receiving unit 213.

A user management DB (data base) 220, a vehicle management DB 221, a charging station management DB 222, a probe DB 223, a road link DB 224, and a map DB 225 are stored in the storage device 202. When required for the program execution of the navigation information generation program 205, these DBs are read into the memory 200 as necessary.

Data received via the communication unit 203 is passed to the route search request acceptance unit 210 or the probe information receiving unit 213 when the data is received from the display terminal 101, and to the charging station information acquisition unit 211 when the data is received from the charging station 103.

When a request is received from the display terminal 101, the route search request acceptance unit 210 executes the shortest route search unit 212. Using the charging station information stored in the charging station management DB 222, the probe information stored in the probe DB 223, the road information stored in the road link DB 224, and the map and slope information stored in the map DB 225, the shortest route search unit 212 searches the routes, via which the electric vehicle 102 can reach from the starting point to the destination using the current remaining battery capacity (SoC: State of Charge) without battery exhaustion, for a route that requires the shortest travel time including the charging time. Then, the shortest route search unit 212 sends the route search result to the display terminal 101 via the communication unit 203 and the network 104.

When a route search request is received from the display terminal 101, the charging station information acquisition unit 211 collects information on the charging facility usage status and usage schedule status (hereinafter called availability information) from a plurality of charging station 103 and stores the collected information in the charging station management DB 222.

The probe information receiving unit 213 receives the probe information from the display terminal 101 and stores the received probe information in the probe DB 223.

Figure 3:
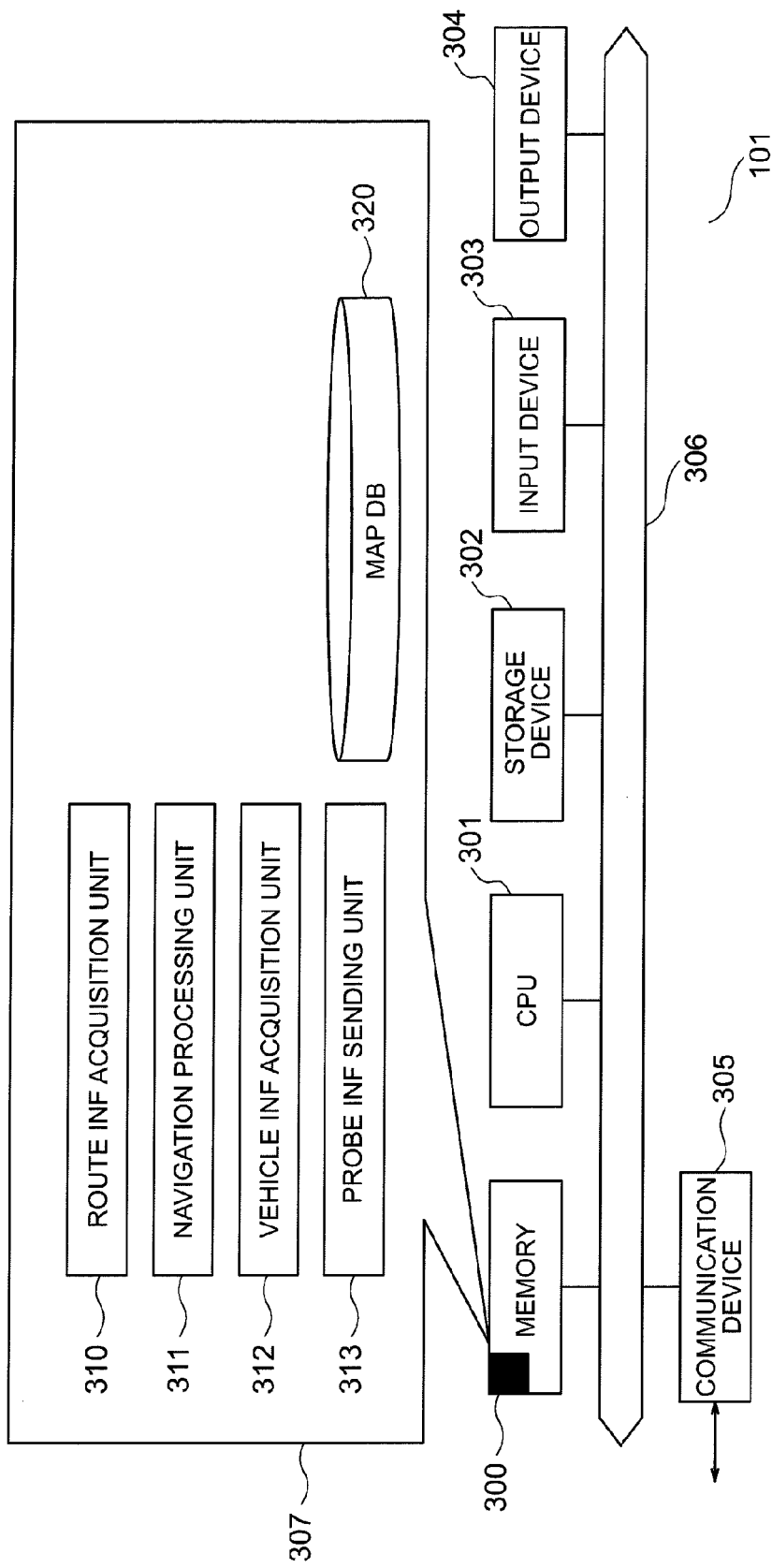
FIG. 3 is a diagram showing an example of the internal configuration of a display terminal.

FIG. 3 is a diagram showing an example of the internal configuration of the display terminal 101.

Referring to FIG. 3, the display terminal 101 includes a memory 300 to or from which the CPU writes and reads data during program execution, a CPU 301 that executes a program, read into the memory 300, for performing the processing described below, a storage device 302 such as a hard disk in which a navigation information display program 307 is stored, an input device 303 such as a keyboard and a mouse, an output device 304 such as a display, a communication device 305 that carries out communication with the telematics center 100 and the electric vehicle 102 over the network 104, and an internal communication line 306 such as a bus via which the modules are connected. The input device 303, such as a touch panel, may be integrated into the output device 304.

The navigation information display program 307 includes the programs that implement a route information acquisition unit 310, a navigation processing unit 311, a vehicle information acquisition unit 312, and a probe information sending unit 313.

A map DB 320 is stored in the storage device 302. A part or the whole of map information is read into the memory 300 as necessary whenever it is required during the program execution of the navigation information display program 307.

Data received via the communication device 305 is passed to the route information acquisition unit 310 when the data is received from the telematics center 100, and to the vehicle information acquisition unit 312 when the data is received from the electric vehicle 102.

When a user's route search request, which includes information on the starting point and the destination, is received via the input device 303, the route information acquisition unit 310 sends the information on the starting point, the destination, the remaining battery capacity, and the battery capacity to the telematics center 100 as a route search request. After that, the route information acquisition unit 310 outputs the route search result received from the telematics center 100, as well as the map information stored in the map DB 320, to the output device 304.

The navigation processing unit 311 guides the electric vehicle 102 to the destination when the electric vehicle 102 starts traveling based on the route search information acquired by the route information acquisition unit 310. In addition, the navigation processing unit 311 outputs to the output device 304 the information as to whether the pace of the battery consumption of the electric vehicle 102, which is currently traveling, is faster or slower than the pace expected by the route search result in a format the user can understand quickly.

Depending upon the comparison result, there is a possibility that the battery will run out or that the optimal route has been changed to another route because the battery power is sufficient. In such a case, the navigation processing unit 311 calls the route information acquisition unit 310 as necessary during route guiding to update the route search result to the latest result.

When a user's route search request is received via the input device 303 or a request is received from the navigation processing unit 311, the vehicle information acquisition unit 312 acquires information on the remaining battery capacity and the battery capacity of the user's electric vehicle 102. This information is required by the route information acquisition unit 310.

Figure 4:
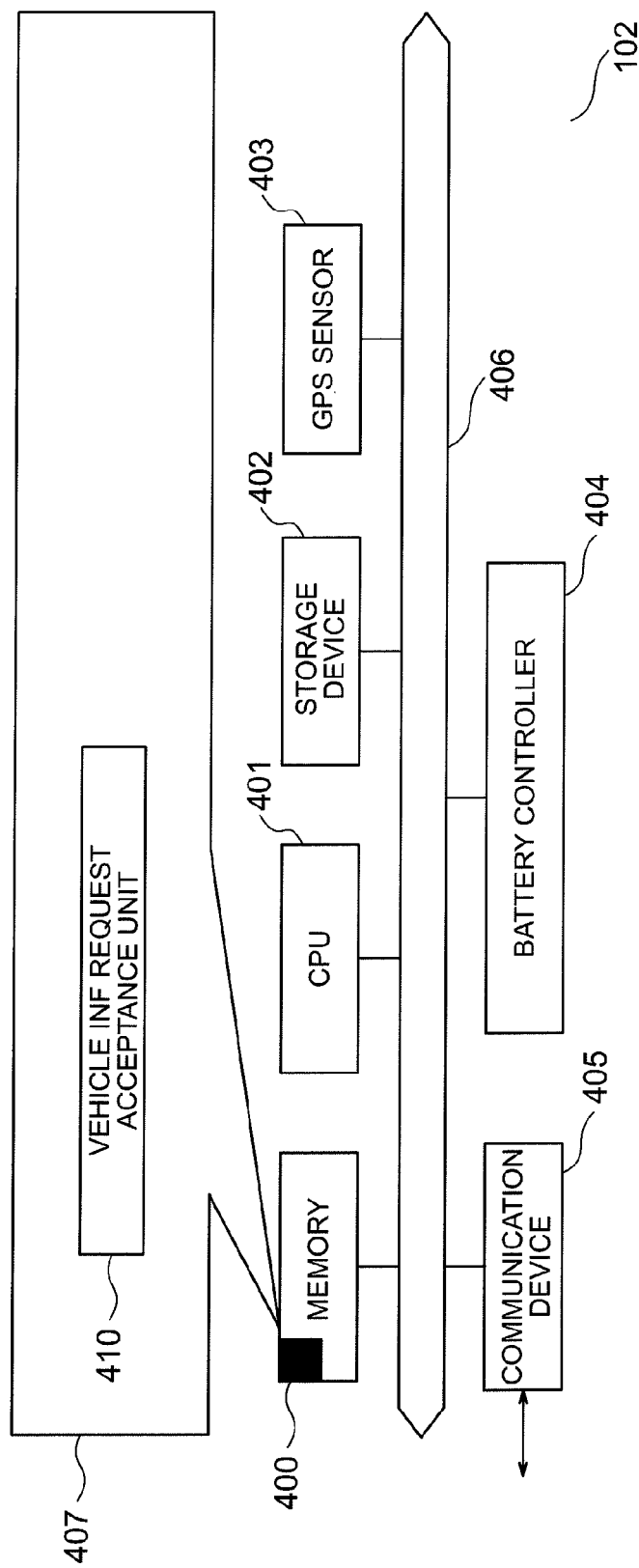
FIG. 4 is a diagram showing an example of the internal configuration of an electric vehicle.

FIG. 4 is a diagram showing an example of the internal configuration of the electric vehicle 102.

Referring to FIG. 4, the electric vehicle 102 includes a memory 400 to or from which the CPU writes and reads data during program execution, a CPU 401 that executes a program, read into the memory 400, for performing the processing described below, a secondary storage device 402 such as a hard disk in which a vehicle information control program 407 is stored, a GPS sensor 403 that acquires the location information on the vehicle, a battery controller 404 that controls the charging/discharging of the batteries of the electric vehicle 102 and acquires information on the current remaining battery capacity and the battery capacity, a communication device 405 that carries out communication with the telematics center 100 over the network 104, and an internal communication line 406 such as a bus and a controller area network (CAN) via which the modules are connected.

The vehicle information control program 407 includes a program that implements a vehicle information request acceptance unit 410.

Data received via the communication device 405 is passed to the vehicle information request acceptance unit 410 if the data is received from the display terminal 101.

When a request is received from the display terminal 101, the vehicle information request acceptance unit 410 acquires the location positioning result from the GPS sensor 403, acquires information on the current battery remaining capacity and the battery capacity from the battery controller 404, and sends the acquired information to the telematics center 100 via the communication device 405 and the network 104.

Figure 5:
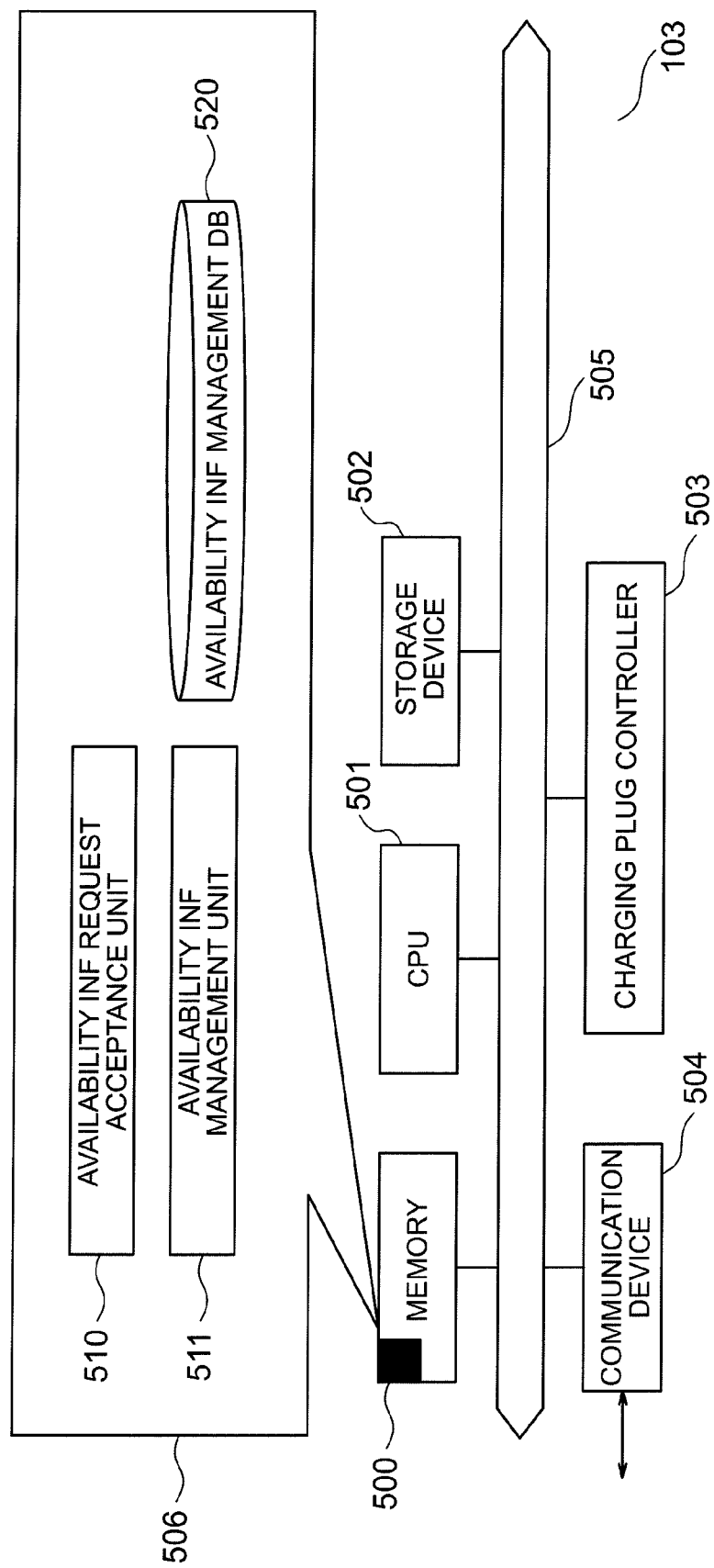
FIG. 5 is a diagram showing an example of the internal configuration of a charging station.

FIG. 5 is a diagram showing an example of the internal configuration of the charging station 103.

Referring to FIG. 5, the charging station 103 includes a memory 500 to or from which the CPU writes and reads data during program execution, a CPU 501 that executes a program, read into the memory 500, for performing the processing described below, a storage device 502 such as a hard disk in which a charging station information control program 506 is stored, a charging plug controller 503 that performs the charging/discharging control of one or more charging plugs, a communication device 504 that carries out communication with the telematics center 100 over the network 104, and an internal communication line 505 such as a bus via which the modules are connected.

The charging plugs are connected to the charging plug controller 503. When the charging station 103 has multiple types of plugs or multiple plugs of the same type, the corresponding number of charging plugs are connected to the charging plug controller 503.

The charging station information control program 506 includes the programs that implement an availability information request acceptance unit 510 and an availability information management unit 511.

An availability information management DB 520, stored in the storage device 502, is read into the memory 500 as necessary whenever it is required for the program execution of the charging station information control program 506.

Data received via the communication device 504 is passed to the availability information request acceptance unit 510 if the data is received from the telematics center 100.

The availability information management unit 511 manages a charging schedule time at which the electric vehicle 102, currently connected to the charging plug, will use the charging station and stores that information in the availability information management DB 520.

The charging station 103 may have the charging-station usage reservation function. For example, a possible configuration of the charging station 103 is that the charging station 103 includes an input device such as a touch panel for allowing the user to make a charging time reservation on the screen or that the display terminal 101 connects to the charging station 103 via the network 104 and the communication device 504 to allow the user to make a charging time reservation for the charging station 103.

When a request is received from the telematics center 100, the availability information request acceptance unit 510 sends a part of the availability information, as well as the charging station identifier (hereinafter called a charging station identifier (CSID)), to the telematics center 100 via the communication device 504 and the network 104. This availability information, stored in the availability information management DB 520, is information on the time zones, beginning at the current time, for which the usage is scheduled. When the charging station 103 has a plurality of charging plugs, each plug has a unique CSID.

FIG. 6 is a diagram showing an example of the format (600-603) of the user management DB 220 and an example of the format (610-616) of the charging station management DB 222. These DBs are managed by the telematics center 100.

In the user management DB 220 in FIG. 6, the numeral 600 indicates a user ID that is an identifier uniquely identifying a user, the numeral 601 indicates the last date/time at which the information on the user with the identifier in numeral 600 was acquired last, the numeral 602 indicates the position information that is the acquired user information, and the numeral 603 indicates the usage status that is the acquired user information.

In the charging station management DB 222 in FIG. 6, the numeral 610 indicates a CSID that is an identifier uniquely identifying a charging station, the numeral 611 indicates the information on the position where the charging station is located, the numeral 612 indicates the type of the charging method of the charging station, the numeral 613 indicates the output power of the charging station, the numeral 614 indicates the connector shape of the plug used at the charging station, the numeral 615 indicates the availability information that is the availability information and the waiting time information on the charging station, and the numeral 616 indicates the last acquisition date/time at which the information on the charging station was acquired.

FIG. 7 is a diagram showing an example of the format (700-705) of the probe DB 223 and an example of the format (710-716) of the road link DB 224. These DBs are managed by the telematics center 100.

In the probe DB 223 in FIG. 7, the numeral 700 indicates a probe ID 700 that is an identifier uniquely identifying collected probe information, the numeral 701 indicates a road link ID indicating a road for which the probe information is collected, the numeral 702 indicates a passage time that is a time at which the probe information was generated, the numeral 703 indicates a passage-time remaining battery capacity indicating the remaining battery capacity when the probe information was generated, the numeral 704 indicates a passage-time electric mileage that is electric mileage information on the electric vehicle 102 when the probe information was generated, and the numeral 705 indicates a last-transit CSID that identifies a charging station at which the electric vehicle 102, which generates the probe information, visited last.

In the road link DB 224 in FIG. 7, the numeral 710 indicates a road link ID that is an identifier uniquely identifying road information, the numeral 711 indicates the position information on the entry-side end of the road, the numeral 712 indicates the position information on the exit-side end of the road, the numeral 713 indicates the traveling time required to travel on the road from position information 1 to position information 2, the numeral 714 indicates the traveling distance, the numeral 715 indicates the required battery capacity, and the numeral 716 indicates the name of the road.

The required battery capacity in the numeral 715 is calculated using the information, such as the slope information, stored in the map DB 225.

The traveling time 713 and the required battery capacity 715 may be changed in real time by the telematics center 100 that calculates them using the traffic congestion information.

Figure 8:
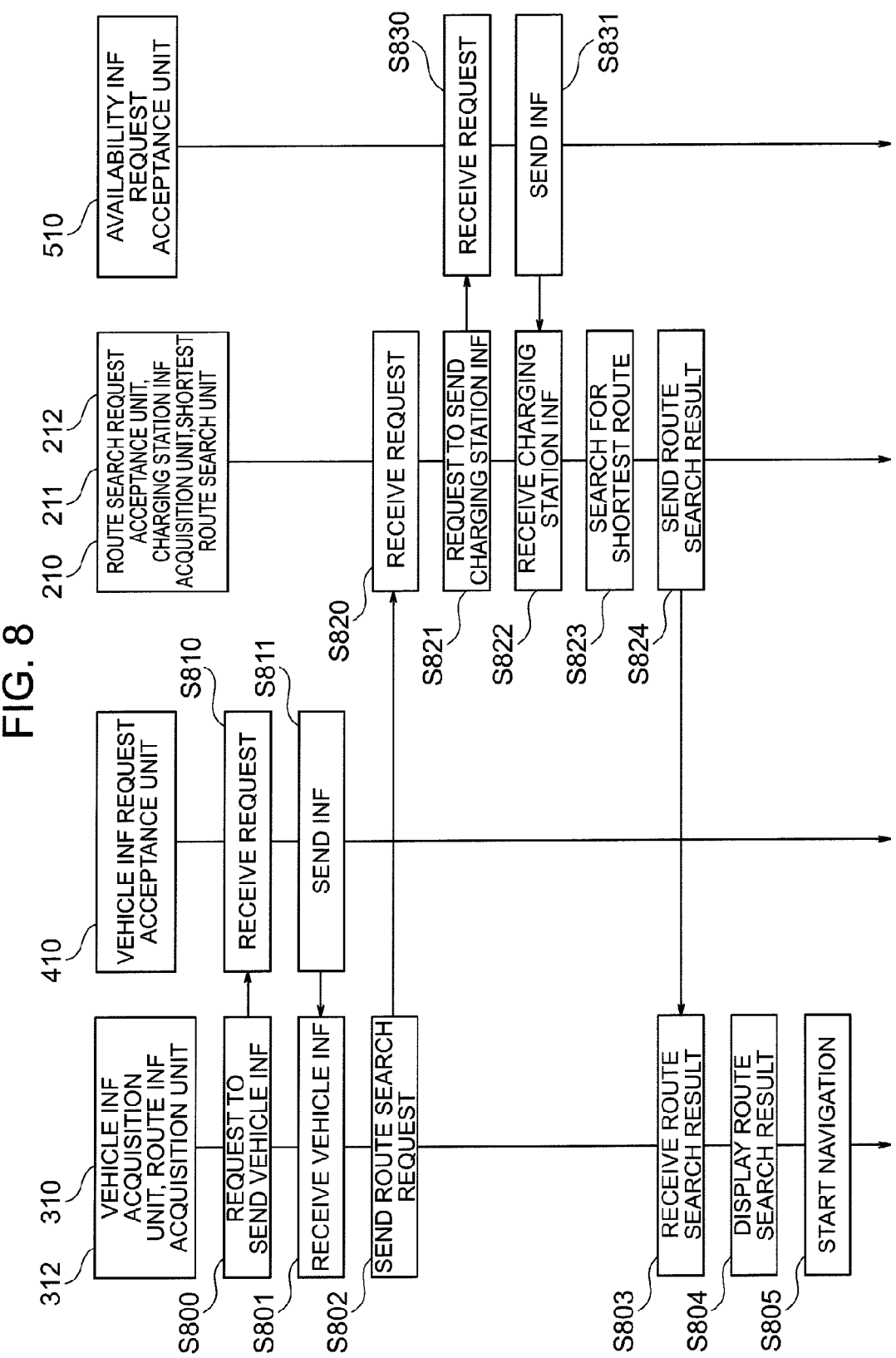
FIG. 8 is a diagram showing an example of a sequence of the route search request processing among the display terminal, the telematics center, the electric vehicle, and the charging station.

FIG. 8 shows the flow of the route search execution processing and the search result display processing performed in the navigation system for an electric vehicle. The processing is performed among the route information acquisition unit 310 and the vehicle information acquisition unit 312 of the display terminal 101, the route search request acceptance unit 210, charging station information acquisition unit 211, and shortest route search unit 212 of the telematics center 100, the vehicle information request acceptance unit 410 of the electric vehicle 102, and the availability information request acceptance unit 510 of the charging station 103.

In FIG. 8, the vehicle information acquisition unit 312 of the display terminal 101 requests the user's electric vehicle 102, which provides the navigation function, to send vehicle information (S800). The vehicle information acquisition unit 312 identifies the user's electric vehicle 102 based on the vehicle identification number (hereinafter called a VIN). That is, the vehicle information acquisition unit 312 searches the electric vehicles around the display terminal for an electric vehicle having a VIN that is registered in the electric vehicle and that matches a VIN registered in the display terminal. At this time, it is also possible to request the user to enter the VIN of the electric vehicle 102, which is used by the user, via the input device 303.

The vehicle information request acceptance unit 410 of the electric vehicle 102 receives the vehicle information request from the display terminal 101 (S810). After that, the vehicle information request acceptance unit 410 acquires the information on the current remaining battery capacity and the battery capacity from the battery controller 404 and sends the acquired information to the display terminal 101 as the vehicle information (S811). The vehicle information request acceptance unit 410 may also acquire the location positioning result from the GPS sensor 403 of the electric vehicle 102 and sends the vehicle information, including the acquired location positioning information, to the display terminal 101 as necessary. In addition, the vehicle information request acceptance unit 410 may also send the vehicle information, which includes the possible traveling distance (electric mileage) per 1 kWh of the electric vehicle 102, to the display terminal 101 as necessary.

The vehicle information acquisition unit 312 of the display terminal 101 receives the vehicle information sent from the vehicle information request acceptance unit 410 of the electric vehicle 102 (S801). After that, the route information acquisition unit 310 acquires the information on the scheduled start time, starting point, and destination from the user via the input device 303 and sends a route search request, in which the acquired information as well as the acquired vehicle information are included, to the telematics center 100 (S802).

The scheduled start time included in the route search request, sent from the route information acquisition unit 310 to the telematics center 100, may be the current time indicated by the clock included in the display terminal 101 or the electric vehicle 102. Instead of including the scheduled start time in the route search request, the request acceptance time indicated by the clock included in the telematics center 100 may also be used as the scheduled start time.

The starting point included in the route search request sent from the route information acquisition unit 310 to the telematics center 100 may be the current position of the electric vehicle 102.

The starting point included in the route search request sent from the route information acquisition unit 310 to the telematics center 100 may be the current position of the user who has the display terminal 101. In this case, the display terminal 101 is supposed to have a GPS sensor mounted thereon, and the position information obtained from the GPS sensor is used as the starting point.

Any information other than a VIN may also be used to identify the electric vehicle 102 when the information uniquely identifies the vehicle. For example, when the telematics center 100 has the user management DB in which the correspondence between user identifiers (USERID) and VINs is stored, a USERID may be used in place of a VIN. In addition, to acquire the vehicle information in S800-S801, the display terminal 101 and the electric vehicle 102 may communicate with each other via the telematics center. For example, the display terminal 101 sends a USERID to the telematics center 100. Upon receiving the USERID, the telematics center 100 identifies the VIN associated with the received USERID, requests the electric vehicle 102 with the identified VIN to send the vehicle information, and then delivers the received vehicle information to the display terminal 101.

In place of means for acquiring vehicle information in S800 to S801 by means of the vehicle information acquisition unit 312, it is also possible to request the user to enter vehicle information from the input device 303, in which case the entered value is used as the vehicle information.

The route search request acceptance unit 210 of the telematics center 100 receives the route search request from the route information acquisition unit 310 of the display terminal 101 (S820). When the route search request is received, the charging station information acquisition unit 211 requests all charging stations 103 to send the availability information related to a period of time within α hours beginning at the scheduled start time obtained in S820 (S821). α specifies a time zone of availability information to be acquired, for example, a 24-hour period of time beginning at the scheduled start time.

The charging stations 103, to which the charging station information acquisition unit 211 sends an availability information inquiry, may be limited based on the distance between the starting point and the destination or on the cruising range of the electric vehicle derived from the remaining battery capacity and the electric mileage. The charging station information acquisition unit 211 may send an availability information inquiry to the charging stations not only at a route search request reception time. For example, the charging station information acquisition unit 211 of the telematics center 100 may send an availability information inquiry to the charging stations 103 at regular intervals.

The availability information request acceptance unit 510 of the charging station 103 receives the availability information request from the charging station information acquisition unit 211 of the telematics center 100 (S830). The availability information request acceptance unit 510 obtains a charging schedule, which is included in the period of time within α hours beginning at the start time, from the availability information management DB 520 and sends the obtained charging schedule to the telematics center 100 (S831).

The charging station information acquisition unit 211 of the telematics center 100 receives the charging station information from the availability information request acceptance unit 510 of the charging station 103 and then stores the received availability information in the charging station management DB 222 (S822). If the availability information is not used, the processing in S821 to S822 may be omitted.

After that, the shortest route search unit 212 of the telematics center 100 uses the vehicle information and the route search request information, obtained in S820, to search for a route on which the charging stations are available and requires the shortest traveling time that includes the charging time and the wait time for charging (S823). The detailed processing in S823 is described later with reference to FIG. 9. The route search request acceptance unit 210 sends the route search result, obtained in S823, to the display terminal 101 (S824). If the display terminal 101 does not include the map DB 320, the route search request acceptance unit 210 may send the route search result to the display terminal 101 with the map information on the area of the route search result attached as necessary.

The route information acquisition unit 310 of the display terminal 101 receives the route search result from the route search request acceptance unit 210 of the telematics center 100 (S803). Then, the route information acquisition unit 310 outputs the received route search result, as well as the map information obtained from the map DB 320, to the output device 304 (S804). After that, in order to start the navigation (route guidance) processing that is described later with reference to FIG. 11, the navigation processing unit 311 is started (S805).

The navigation processing (S805) need not always be started immediately after the route information acquisition unit 310 displays the result in S804. Instead, the selection screen may be displayed on the output device 304 to allow the user to select whether to start navigation, in which case the navigation processing is started when the user selects to start navigation on the input device 303.

Figure 9:
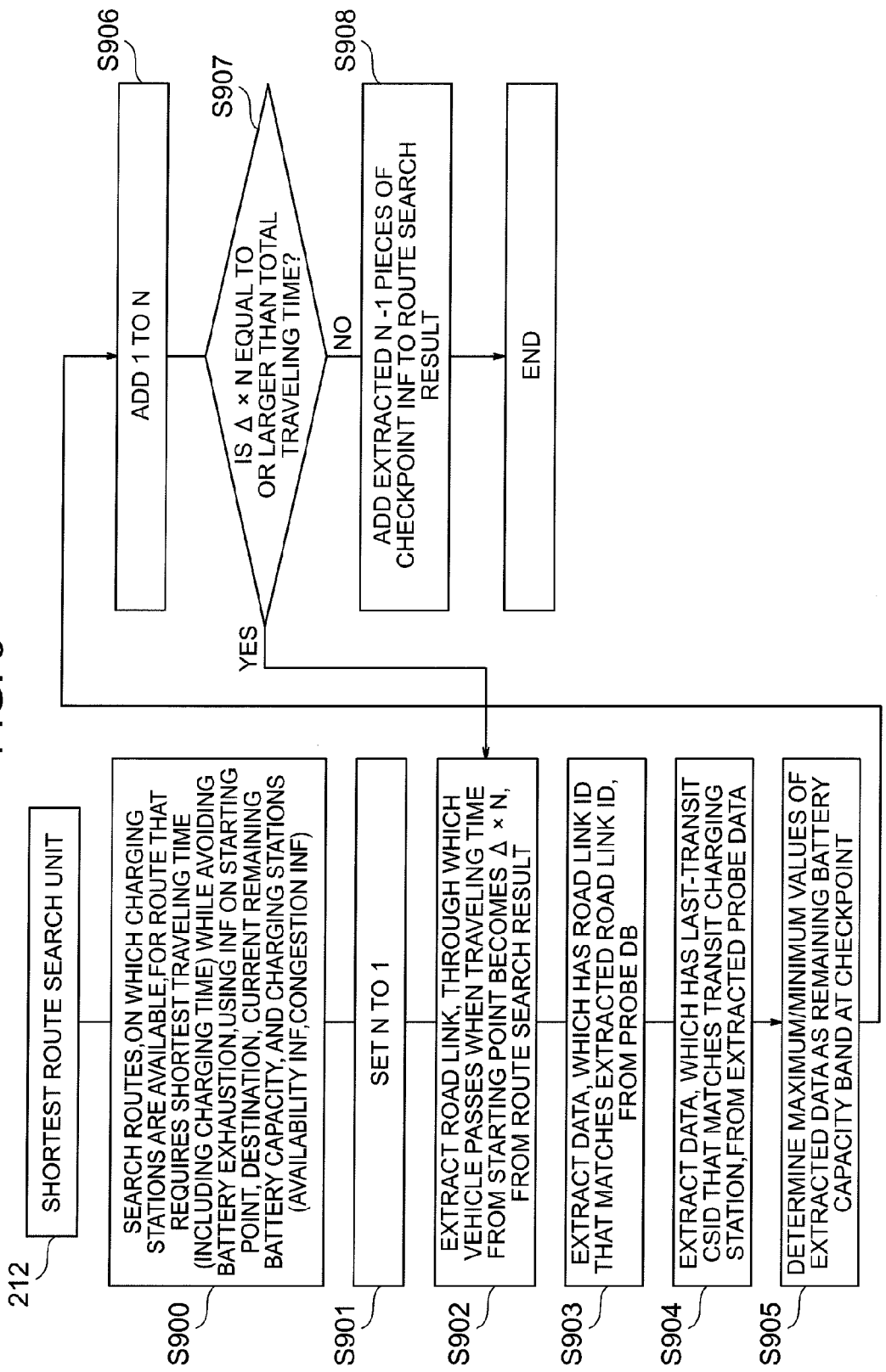
FIG. 9 is a diagram showing an example of a flowchart of the route search processing at the telematics center.

FIG. 9 is a diagram showing the flow of the processing S823 of the shortest route search unit 212 of the telematics center 100 in the navigation system for an electric vehicle, and FIG. 10 is a diagram showing the items of the route search result obtained by the shortest route search unit 212.

In FIG. 9, the shortest route search unit 212 uses the information obtained in S820 and S822 (starting point, destination, current remaining battery capacity, and battery capacity and, as necessary, the availability information on the charging stations or traffic information (congestion information)) to search the routes, on which zero or more charging stations are available, for a route that requires the shortest traveling time (including the charging time) while avoiding battery exhaustion during the travel from the starting point to the destination (S900).

As a method for searching for a route that requires the shortest traveling time (inclining charging time), JP-A-2006-112932 discloses the following method. "The distance from the current position of an electric vehicle to a charging facility and the distance from the charging facility to the destination are calculated respectively from the map information in the database unit, the capacity required for traveling the calculated distance is calculated based on the electric mileage of the electric vehicle, the capacity to be charged at the charging facility is calculated from the required capacity and the remaining in-vehicle battery capacity, and the charging time required for charging the capacity is calculated based on the information on the charging performance of the charging facility (paragraph 0018)".

The route search result obtained in S900 includes the following information. (1) Position information on the starting point and the destination and, as necessary, the position information on a transit charging station and the information on the charging time at the transit charging station, and the information on the total traveling time and the total traveling distance, (2) Information described in Table 1000 in FIG. 10; that is, the information on which intersections the vehicle will pass through to arrive at the destination, an intersection (I/S) ID 1001 described in the order of intersections through which the vehicle will pass through, position information 1002 on the intersection, estimated traveling distance 1003 from the starting point to the intersection, estimated traveling time 1004 from the starting point to the intersection, estimated remaining battery capacity 1005 that is the estimated value of the remaining battery capacity when the vehicle arrives at the intersection, and guiding information 1006 on the traveling direction (turn right/left turn, go straight ahead) when the vehicle travels from the intersection to the next intersection, and (3) Road link information that is stored in the road link DB 224 as the road information between intersections and is a part of information required for linking between the intersections.

Next, by performing the processing in S901 to S908, the shortest route search unit 212 adds the information on a confirmation point (checkpoint: CP, also called a base point) to the route search result, wherein the checkpoint is a base point for confirming the battery status to check whether the currently moving electric vehicle is driving at a satisfactory battery consumption rate.

First, with the identification number, n, of the checkpoint information set to 1, the shortest route search unit 212 performs calculation for the first checkpoint (S901). Based on the estimated traveling time described in Table 1000, the shortest route search unit 212 identifies the information on a section between two intersections (that is, the road link information) through which the vehicle will pass when the traveling time from the starting point becomes n times the predetermined value $\Delta$ and then extracts the road link ID 710 (S902).

The server may set an appropriate value as the predetermined time $\Delta$, or the user may specify the value of $\Delta$ and send a route search request with the specified information included in the request. The shortest route search unit 212 searches the probe DB 223 for a plurality of probe IDs 700, each of which is associated with the road link ID 701 that matches the road link ID 710 extracted in S902, and extracts those entries as the data used to derive the remaining battery capacity that should be reserved at the passage time (S903).

In addition, the shortest route search unit 212 extracts a plurality of pieces of probe data each of which has the last-transit CSID 705 that matches the transit charging station included in the route search result obtained in S900 (S904). The extracted data indicates that one or more electric vehicles, including this vehicle and other vehicles, actually passed the location and arrived at the charging station in the past. The shortest route search unit 212 derives the maximum value and the minimum value of the passage-time remaining battery capacity 703 of the extracted probe data group to identify the range of the estimated remaining battery capacity band estimated at route search time (at the time the driving plan is created) in which the remaining battery capacity should be included when the vehicle passes the checkpoint (S905).

When the derivation of the n-th checkpoint information is completed, the shortest route search unit 212 adds 1 to n (S906) and checks whether n times the predetermined time $\Delta$ is smaller than the total traveling time to see if the next checkpoint should be derived (S907). If n times the predetermined time $\Delta$ is smaller than the total traveling time (S907:

YES), the shortest route search unit 212 returns to S902 to generate the next checkpoint information. If n times the predetermined time Δ is larger than the total traveling time, the shortest route search unit 212 includes the extracted (n−1) pieces of checkpoint information in the route search result and terminates the processing (S908).

The checkpoint information, such as that shown in Table 1010 in FIG. 10, includes a checkpoint ID 1011 that indicates the order of checkpoints from the starting point, position information 1012 that is checkpoint position information such as position information 1 (711) or position information 2 (712) of the corresponding road link or the midpoint of those two positions, a remaining battery capacity upper limit 1013 and a remaining battery capacity lower limit 1014 that indicate the estimated remaining battery capacity band at checkpoint passage time derived in S905, an estimated traveling distance 1015 from the starting point to the checkpoint, and an estimated traveling time 1016 from the starting point.

When identifying a road link in S902 and S907 for determining a checkpoint, the estimated traveling distance or the estimated battery consumption amount may also be used as the base instead of using the estimated traveling time. More specifically, Δ may be the distance or the power amount instead of the time. In addition, the position of a checkpoint for the confirmation may be determined based, not on the distance or the battery consumption amount, but on the intersections. For example, all intersections may be a checkpoint, or the battery status may be confirmed at every 10 intersection or at 100 m ahead of an intersection.

A limitation may be placed on the probe data, from which data is extracted in S903 and S904, based on a time at which traveling history was registered. One of the methods is to use only probe data whose passage time 702 includes a date/time later than one year ago today.

A limitation may be placed on the probe data, from which data is extracted in S903 and S904, based on the VIN of the electric vehicle 102 that registered probe data. One of the methods is to use only probe data on the electric vehicle 102 owned by the user of the display terminal 101 from which a route search request was received or to use only data registered by the electric vehicle 102 that is the same vehicle type as that of the electric vehicle 102 of the user who issued a route search request. In the case of this example, the probe data in the probe DB 223 stores information on the VIN of the electric vehicle 102 that registered probe data and the vehicle management DB 221 stores information on the VIN and the vehicle type for each electric vehicle 102.

When identifying the estimated remaining battery capacity band determined in S903 to S905, the probe data need not always be used. Instead, the values in a predetermined range may also be used based on the estimated remaining battery capacity 1005 corresponding to the intersection ID 1001; for example, a value 3% higher than the base remaining battery capacity may be used as the upper limit value, and a value 7% lower than the base remaining battery capacity as the lower limit value. When entering a route search request, the user may also specify a fixed width of the estimated remaining battery capacity band.

The lower limit value of the estimated remaining battery capacity band may be determined based on the estimated remaining battery capacity 1005 of the intersection ID 1001. That is, the lower value may be calculated by subtracting the estimated remaining battery capacity, which is the remaining capacity at the time the vehicle arrives at the destination or at a transit charging station, from the base remaining battery capacity. The lower limit value may also be the minimum battery capacity determined based on a charging station that can be reached from the intersection ID 1001 with the minimum battery consumption amount.

The upper limit value of the estimated remaining battery capacity band may be the battery capacity required for the vehicle to reach directly from the intersection ID 1001 to the destination.

When the user specifies a remaining battery capacity that will remain when the vehicle arrives at the destination, the upper limit value and the lower limit value of the estimated remaining battery capacity band may be generated by adding the specified remaining battery capacity respectively to the lower limit value and the upper limit value.

Because the eco-driving level differs according to the user, the value of the passage-time remaining battery capacity 703 obtained from the probe data need not directly be used but may be corrected by comparing the value of the passage-time electric mileage 704 with the value of the electric mileage of the electric vehicle 102 that is traveling.

The estimated remaining battery capacity band may be obtained by statistically approximating the probe data. For example, for the probe data group extracted in S903 and S904, the distribution of the passage-time remaining battery capacity 703 is approximated to the normal distribution. In this case, the values calculated as the mean value±δ are used as the upper limit value and the lower limit value of the estimated remaining battery capacity band when the variance of the normal distribution is represented by the square of δ.

In S905, instead of deriving the estimated remaining battery capacity band, the border value (border) of the estimated remaining battery capacity, calculated based on the lower limit value, may also be derived. In this case, the border at the checkpoint is means a value that will cause battery exhaustion with a high probability when the value falls below the remaining battery capacity. The border may also be derived, not by directly using the lower limit value, but by using the average of the upper limit value and the lower limit value or using the median, mode, or average of the passage-time remaining battery capacity 703 of the extracted probe data group.

The number of pieces of checkpoint information actually given to the route search information need not be n−1, but n−2, n−3, . . . , or n pieces of checkpoint information from the starting point or the destination may be given. The information may be given to the route search result by thinning out n−1 checkpoints in such a way that the checkpoint interval becomes longer as the checkpoints are nearer to or farther from the destination.

Figure 11:
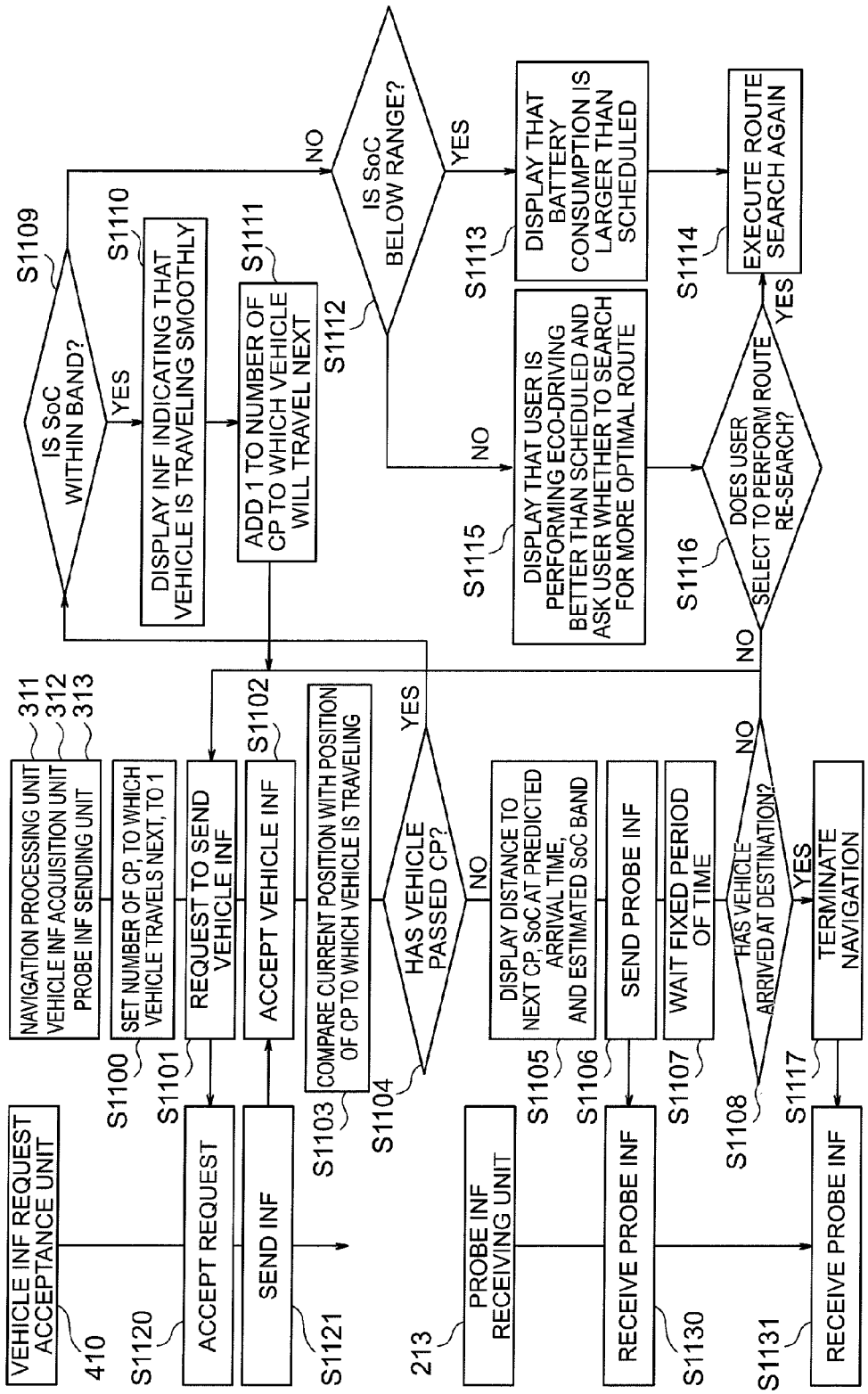
FIG. 11 is a diagram showing an example of a flowchart of the navigation processing at the display terminal.

FIG. 11 is a diagram showing the flow of the processing S805 performed by the navigation processing unit 311 of the display terminal 101 in the navigation system for an electric vehicle.

In FIG. 11, to start navigation based on the route search result obtained in S803, the navigation processing unit 311 first sets the checkpoint number to 1 as the number of the checkpoint to which the vehicle first travels from the starting point (S1100).

Next, via the vehicle information acquisition unit 312, the navigation processing unit 311 requests the electric vehicle 102, which is being driven by the user, to send vehicle information (S1101). When the request is received (S1120), the vehicle information request acceptance unit 410 of the electric vehicle 102 sends the information obtained from the battery controller, such as the remaining battery capacity and the battery capacity, to the vehicle information acquisition unit 312 as the vehicle information (S1121), the vehicle information acquisition unit 312 of the display terminal 101 receives the information and passes the received information to the navigation processing unit 311 (S1102). The processing in S1101 to S1102 is equivalent to the processing shown in S800 to S801.

Next, the navigation processing unit 311 compares the current position of the current electric vehicle 102, obtained as the received vehicle information, with the position information on the checkpoint which is included in the route search result and to which the vehicle is currently traveling (S1103). The navigation processing unit 311 compares the two positions, for example, by checking whether the difference both in latitude and in longitude is a fixed value of β or smaller.

The navigation processing unit 311 performs this comparison to determine whether the current position almost coincides with the checkpoint, that is, whether the vehicle indicated by the current position is passing the checkpoint (S1104). If the vehicle is not passing the checkpoint (S1104: NO), the navigation processing unit 311 determines that the vehicle is still traveling to the next checkpoint, confirms the distance to the next checkpoint and the estimated remaining battery capacity band at that checkpoint, calculates the estimated remaining battery capacity when the vehicle arrives at the next checkpoint, and displays the calculated result on the output device 304 (S1105). The estimated remaining battery capacity C when the vehicle arrives at the next checkpoint is calculated as follows.

$$C=S-Z*K/Y$$

where, Y is the estimated battery consumption mount from the starting point to the current position included in the route search result, K is the estimated battery consumption amount from the current position to the next CP that can be derived from the route search result, Z is the battery amount consumed from the starting point as a result of the actual driving, and S is the current remaining battery capacity obtained in S1102. "*" is a multiplication sign.

The navigation processing unit 311 sends, via the probe information sending unit 313, the position information on the current position and the remaining battery capacity, which are obtained as the passage result, to the telematics center as the probe information for use as the information to be provided to other electric vehicles (S1106) and waits a fixed amount of time, for example, one second, to interrupt the navigation processing (S1107). The probe information receiving unit 213 of the telematics center 100 receives the probe information and stores it in the probe DB 223 (S1130).

The step in which the navigation processing unit 311 waits a fixed amount of time in S1107, that is, the navigation processing interrupt step, may be omitted. The processing for waiting a fixed period of time may be performed, for example, immediately before S1001.

The navigation processing unit 311 determines whether the position information, identified by the vehicle information received from the electric vehicle 102, indicates a position near the destination or a transit charging station or indicates that the vehicle has arrived at the destination or a transit charging station (S1108).

If it is determined that the vehicle has not yet arrived at the destination or a transit charging station (S1108: NO), the navigation processing unit 311 executes processing again, beginning at S1101, to continue the navigation processing.

If it is determined that the vehicle has arrived at the destination or a transit charging station (S1108: YES), the navigation processing unit 311 terminates the navigation and, via the probe information sending unit 313, sends the information on the destination or the transit charging station, at which the vehicle has arrived, and the probe information, which has been sent, to the telematics center, as the general traveling history (S1117). The probe information receiving unit 213 of the telematics center, which receives the probe information, uses the received information to add the information to the last-transit CSID already registered in the probe DB 223 (S1131).

The step S1108 for determining whether the vehicle has arrived at the destination may be executed any time between S1102 and S1117, for example, before S1103.

The values calculated in S1105 are optionally not displayed on the output device 304 depending upon the positional relation between the current position and the next checkpoint. For example, if the distance to the next checkpoint is 1 km or longer or the traveling time to the next checkpoint is 10 minutes or longer, the values are optionally not displayed on the output device 304.

If it is determined in S1104 that the vehicle has passed a checkpoint, the navigation processing unit 311 compares the remaining battery capacity (confirmation-point remaining battery capacity) acquired at checkpoint passage time with the estimated remaining battery capacity band at the checkpoint, acquired at route search time, to see if the confirmation-point remaining battery capacity is within the estimated remaining battery capacity band (S1109). If the confirmation-point remaining battery capacity is within the estimated remaining battery capacity band (S1109: YES), the navigation processing unit 311 displays the information, which indicates that the vehicle is traveling on the route with a satisfactory battery consumption amount, on the output device 304 of the display terminal 101 (S1110). In addition to the information indicating that the vehicle is driving smoothly as expected, the information on eco-driving may also be displayed. For example, if the confirmation-point remaining battery capacity is currently in the lower half of the estimated remaining battery capacity band, the information may be displayed to advise the driver to try to perform eco-diving. After displaying the information on the screen, the navigation processing unit 311 increments the number of the checkpoint, to which the vehicle will travel next, by 1 (S1111) and executes the processing again beginning at S1101 to continue the navigation processing. Before executing the processing in S1101 again, the navigation processing unit 311 may perform the processing, similar to that in S1107, to suspend the navigation processing.

If the remaining battery capacity at the current confirmation point is outside the estimated remaining battery capacity band (S1109: NO), the navigation processing unit 311 determines whether the remaining battery capacity is below the estimated remaining battery capacity band (S1112). If the remaining battery capacity at the current confirmation point is below the estimated remaining battery capacity band (S1112: YES), the navigation processing unit 311 displays the information, which indicates that the consumption amount is larger than the amount that is consumed according to the scheduled battery consumption pace estimated in the route search result, on the output device 304 of the display terminal 101 (S1113). After that, the navigation processing unit 311 performs the route search request processing, shown in FIG. 8, again (S1114) because there is a possibility that the battery exhaustion will occur before the vehicle arrives at a charging station or a transit location if the vehicle continues driving at the current traveling pace.

If the remaining battery capacity at the current confirmation point is above the estimated remaining battery capacity band (S1112: NO), the navigation processing unit 311 displays the information on the output device 304 to indicate that the user is performing eco-driving better than scheduled.

After that, the navigation processing unit 311 displays the information on the output device 304 to ask the user whether to search for an optimal route that requires a shorter traveling time (including the charging time) because the battery capacity is sufficient (S1115). The navigation processing unit 311 accepts a user option from the input device 303 (S1116) and, if the user selects to perform a route re-search (S1116: YES), performs the route search processing, shown in FIG. 8, again (S1114).

If the user does not select to perform a route re-search (S1116: NO), the navigation processing unit 311 executes the processing again, beginning at S1101, to continue the navigation processing.

If the user does not enter an option in response to the information in S1115 for a predetermined time, the display terminal 101 may automatically determine that the user selects, or does not select, to perform a re-search. Whether to perform a route re-search may be determined, not on the period of time the user does not enter an option, but on the traveling distance of the electric vehicle 102.

If the estimated remaining battery capacity at a checkpoint is indicated, not by the band information, but by a border value (border), one possible method is to execute, not the processing in S1109, but the processing in S1112 when the navigation processing unit 311 determines in S1104 that the vehicle has passed the checkpoint (S1104: No).

The processing in S1103, S1104, and S1105 may be performed, not by the navigation processing unit 311 of the display terminal 101, but by the telematics center 100. More specifically, the vehicle information acquired in S1102 is sent to the telematics center 100 to allow the telematics center 100 to perform the processing in S1103, S1104, and S1105 using the calculated route search result, and the information on the next checkpoint, obtained in S1105, is sent to the display terminal 101.

Similarly, the processing subsequent to S1103, S1104, and S1109 may be performed, not by the display terminal 101, but by the telematics center 100.

Next, with reference to FIG. 12 to FIG. 15, an example of the screen of a display terminal is described where the input device 303 and the output device 304 of the display terminal 101 are implemented by the same medium such as a touch panel.

Figure 12:
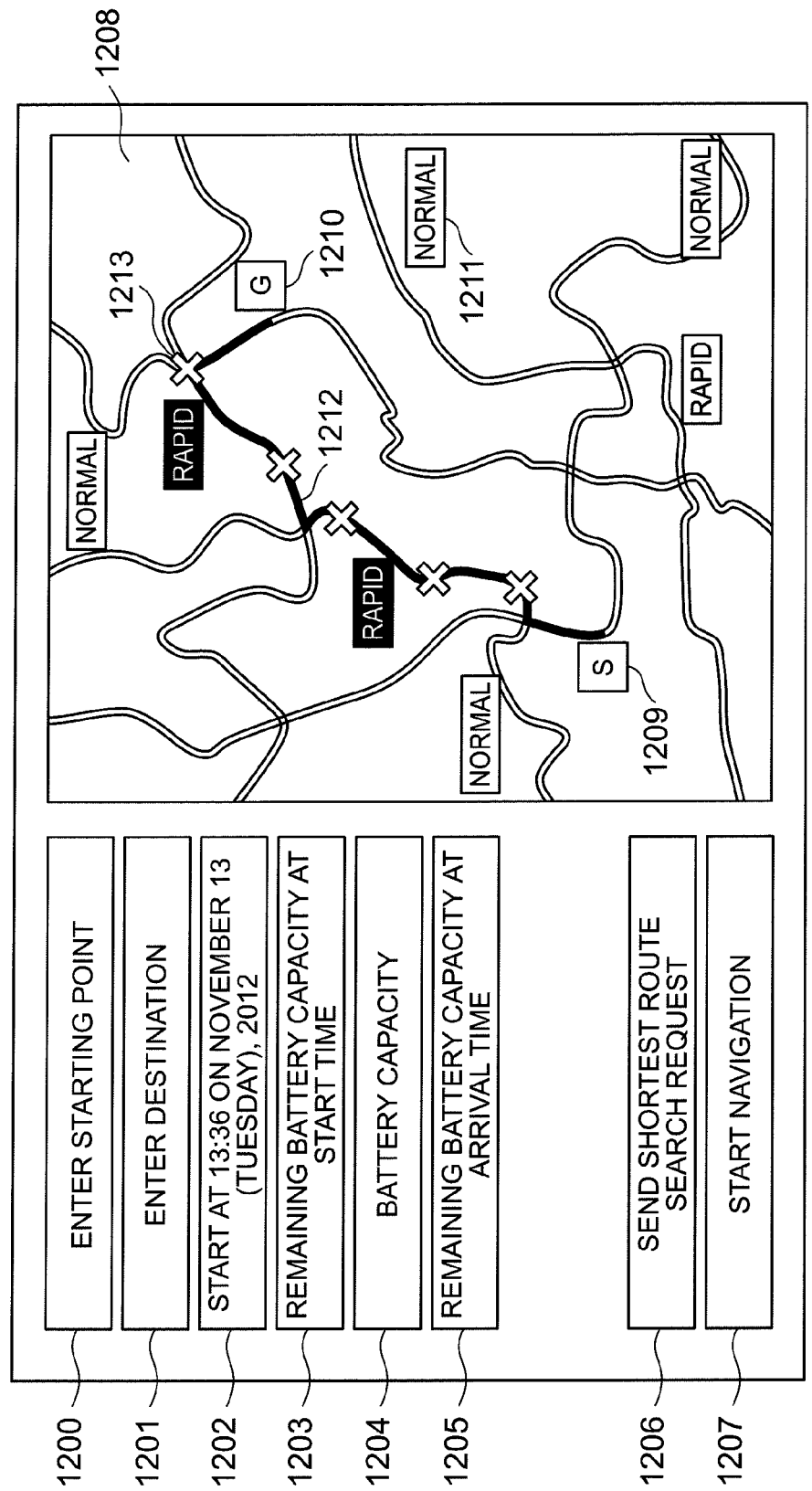
FIG. 12 is a diagram showing an example of the screen configuration on the output device of the display terminal.

FIG. 12 is a diagram showing an example of the route search setting and route search result screen of the navigation system for an electric vehicle. This screen is displayed on the output device 304 of the display terminal 101.

In FIG. 12, the following are output on the output device 304: an area 1200 in which a starting point is entered, an area 1201 in which a destination is entered, an area 1202 in which a start time is entered, an area 1203 in which the remaining battery capacity of the electric vehicle 102 at the starting point is entered, an area 1204 in which the battery capacity of the electric vehicle 102 is entered, an area 1205 in which the remaining battery capacity when the vehicle arrives at the destination is specified, a button 1206 that triggers the issuance of a shortest route search request from the display terminal 101 to the telematics center 100, a button 1207 that triggers the start of the navigation processing in S805 performed by the display terminal 101, a map 1208, an image 1209 that indicates the position of the starting point, an image 1210 that indicates the position of the destination, an image 1211 that indicates the position and type of a charging station, and a shortest route search result 1212 that is based on the specified starting point, destination, start time, confirmation-point remaining battery capacity, battery capacity, and estimated remaining battery capacity at the arrival time. An image 1213, which indicates the position of a checkpoint, is also displayed in the shortest route search result.

A starting point can be registered in the starting point entry area 1200, for example, by specifying the latitude and longitude information. After the starting point is registered, the image 1209 indicating the position of the starting point is displayed on the map 1208.

A destination can be registered in the destination entry area 1201, for example, by specifying the latitude and longitude information. After the destination is registered, the image 1210 indicating the position of the destination is displayed on the map 1208.

The display terminal 101 may have the point search function, in which case the user enters the character string of a facility name to search for the specified facility and specifies the latitude and longitude information on the starting point and the destination. Similarly, the telematics center 100 may have the point search function, in which case the display terminal sends the character string of a facility name to the telematics center and inquires about the search result.

The remaining battery capacity and the battery capacity at the starting point may be displayed automatically by the display terminal 101 using the vehicle information received in S801.

The shortest route search result 1212 is displayed along a road on the map according to the search result. If there is a transit charging station, the color of the image 1211 of the charging station is inverted to make it easy to understand that the charging station is a transit charging station.

It is also possible to allow the user to specify a plurality of transit points from the input device 303 in the order in which the vehicle will reach. If there are transit points, a route search request is sent to the telematics center 100 to inquire about the three (from the starting point to a transit point, between transit points, and from a transit point to the destination) and the route search results are combined and displayed.

When outputting the screen on the output device 304, the display terminal 101 may send an inquiry to the electric vehicle 102 to display the position information on the electric vehicle 102, as well as the images, on the map 1208 or to display the position information on the electric vehicle 102 as the initial value of the starting point entry area 1200 using the latitude and longitude information or the address.

Figure 13:
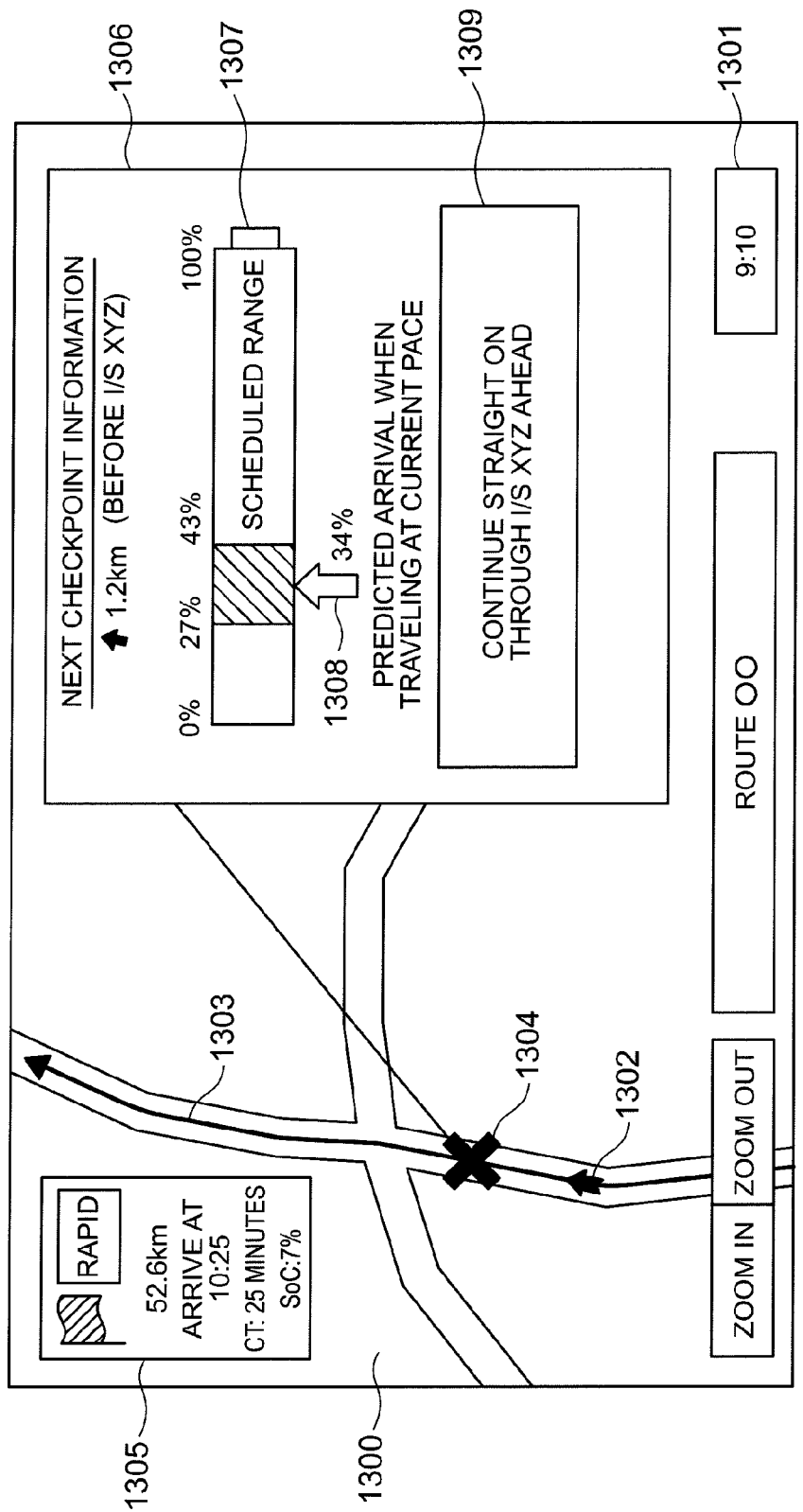
FIG. 13 is a diagram showing an example of the screen configuration on the output device of the display terminal.

FIG. 13 is a diagram showing an example of the navigation screen of the navigation system for an electric vehicle that is displayed on the output device 304 of the display terminal 101.

In FIG. 13, the following are displayed on the output device 304: a map 1300, an image 1301 that indicates the current time, an image 1302 that indicates the current position of an electric vehicle that is traveling, an image 1303 that indicates the route search result overplayed on the map, an image 1304 that indicates the position of the next checkpoint, the destination or a transit charging station 1305 to which the vehicle is currently traveling, an image 1306 that indicates the detailed information on the checkpoint, an image 1307 included in the image 1306 for illustrating the remaining battery capacity and the estimated remaining battery capacity band at the checkpoint, an image 1308 that illustrates the confirmation-point remaining battery capacity when the vehicle passed the checkpoint, and an area 1309 in which the characters describing the checkpoint or the route guidance are displayed.

In the map 1300, the map data included in the map DB 320 of the display terminal 101 is displayed. The map data includes the road information and the facility information including the information on charging stations. This information may also be obtained by sending an inquiry to the telematics center 100.

In the image 1305, for a point (one of a transit point, the destination, and a transit charging station) to which the vehicle is traveling, the remaining traveling distance to that point and the expected arrival time are displayed. When the point is a transit charging station, the type of the charging station, the charging time (CT) at the transit charging station, and the estimated remaining battery capacity (SoC) at an arrival time are displayed.

In the image 1306, for the checkpoint that the vehicle will pass next, the remaining battery capacity band of the checkpoint is displayed in a visualized format. In addition, the confirmation-point remaining battery capacity, which is the predicted value at checkpoint-passage time calculated in S1005, is displayed.

In the image 1307, the battery capacity as well as the estimated arrival-time remaining battery capacity and the estimated remaining battery capacity band, both of which are calculated in S1105, are displayed. A battery value, though displayed as the percentage (%) of the battery capacity in FIG. 13, may also be displayed by an absolute value, for example, in terms of kWh or may be displayed as a value in terms of distance (km) using the electric mileage of the electric vehicle 102 being navigated.

The image 1308 indicates the relative position of the estimated remaining battery capacity at the checkpoint arrival-time calculated in S1105 with respect to the image 1307 that indicates the estimated remaining battery capacity band. In the example in FIG. 13, it is presumed that the vehicle will pass the next checkpoint when the remaining battery capacity is 34%, indicating that the presumed value falls in the remaining battery capacity band from 27% to 43%.

In the area 1309, for the route search result displayed in the image 1303, the information on the direction in which the electric vehicle 102 is to travel or the information on an intersection at which the vehicle is to turn right or left is displayed.

In the area 1309, the information on the charging stations around the current point, for example, the charging station with the shortest traveling distance from the current point, may be displayed. For example, the traveling distance to that charging station and the required power consumption are displayed.

When the checkpoint information is displayed, not by the remaining battery capacity band, but by border information represented by a border value, it is possible to display only a borderline, in place of a strip-shaped image, in the image 1307.

Figure 14:
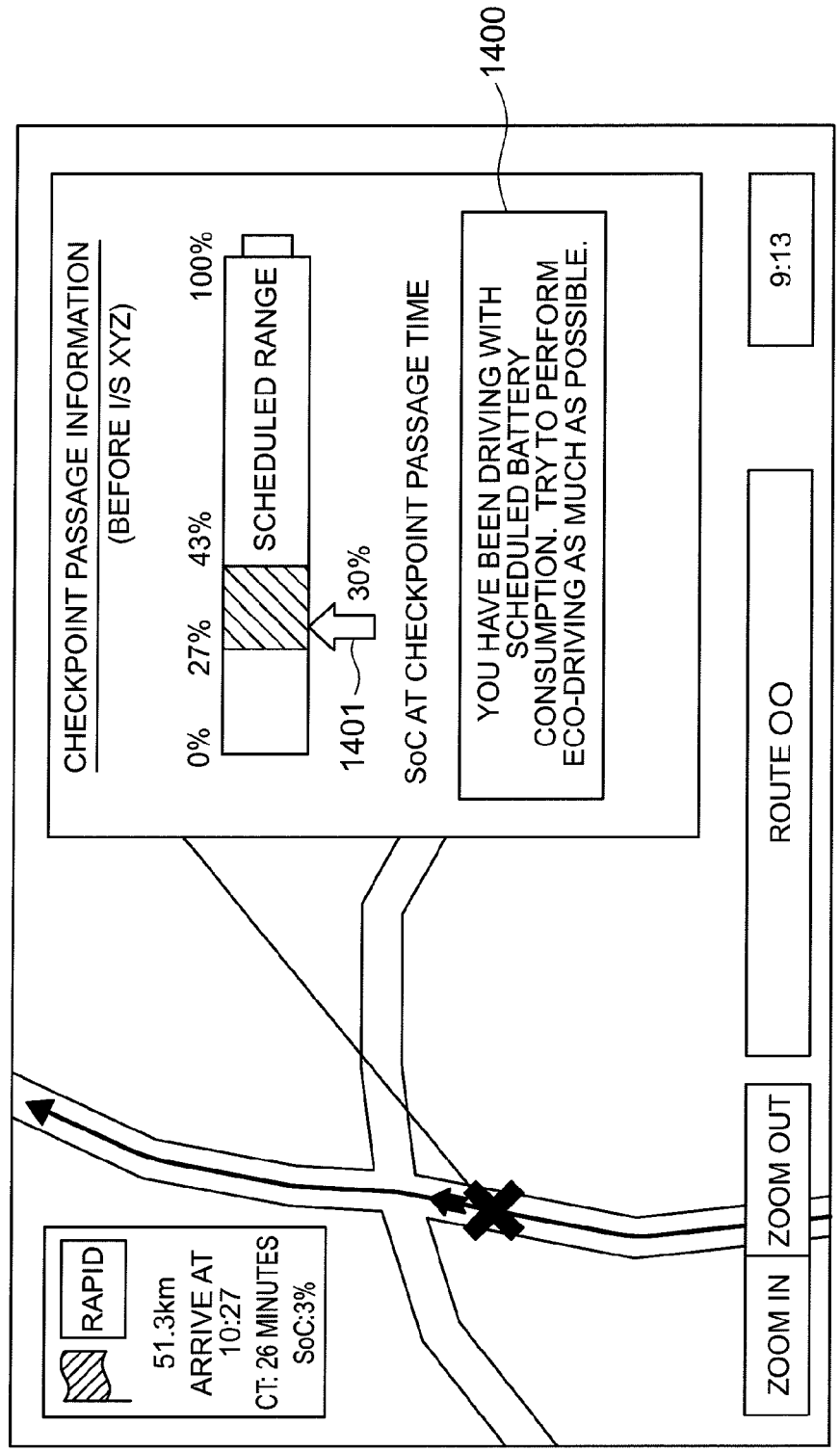
FIG. 14 is a diagram showing an example of the screen configuration on the output device of the display terminal.

FIG. 14 is a diagram showing an example of the navigation screen of the navigation system for an electric vehicle that is displayed on the output device 304 of the display terminal 101.

FIG. 14 shows the navigation screen that is displayed when the confirmation-point remaining battery capacity at a checkpoint-passage time is within the estimated remaining battery capacity band at the checkpoint. In addition to the items shown in FIG. 12, the message, which indicates that the remaining battery capacity at a checkpoint-passage time is within the remaining battery capacity band at the checkpoint, is displayed in an area 1400 where a message about the checkpoint is displayed. An image 1401 that indicates the confirmation-point remaining battery capacity, which is the actual measurement value at checkpoint passage time, is also displayed. In addition, because the remaining battery capacity at the checkpoint passage time is 30% that belongs to the lower half of the remaining battery capacity band 27% to 43%, the message advising the user to try to perform eco-driving is displayed in the area 1400.

Figure 15:
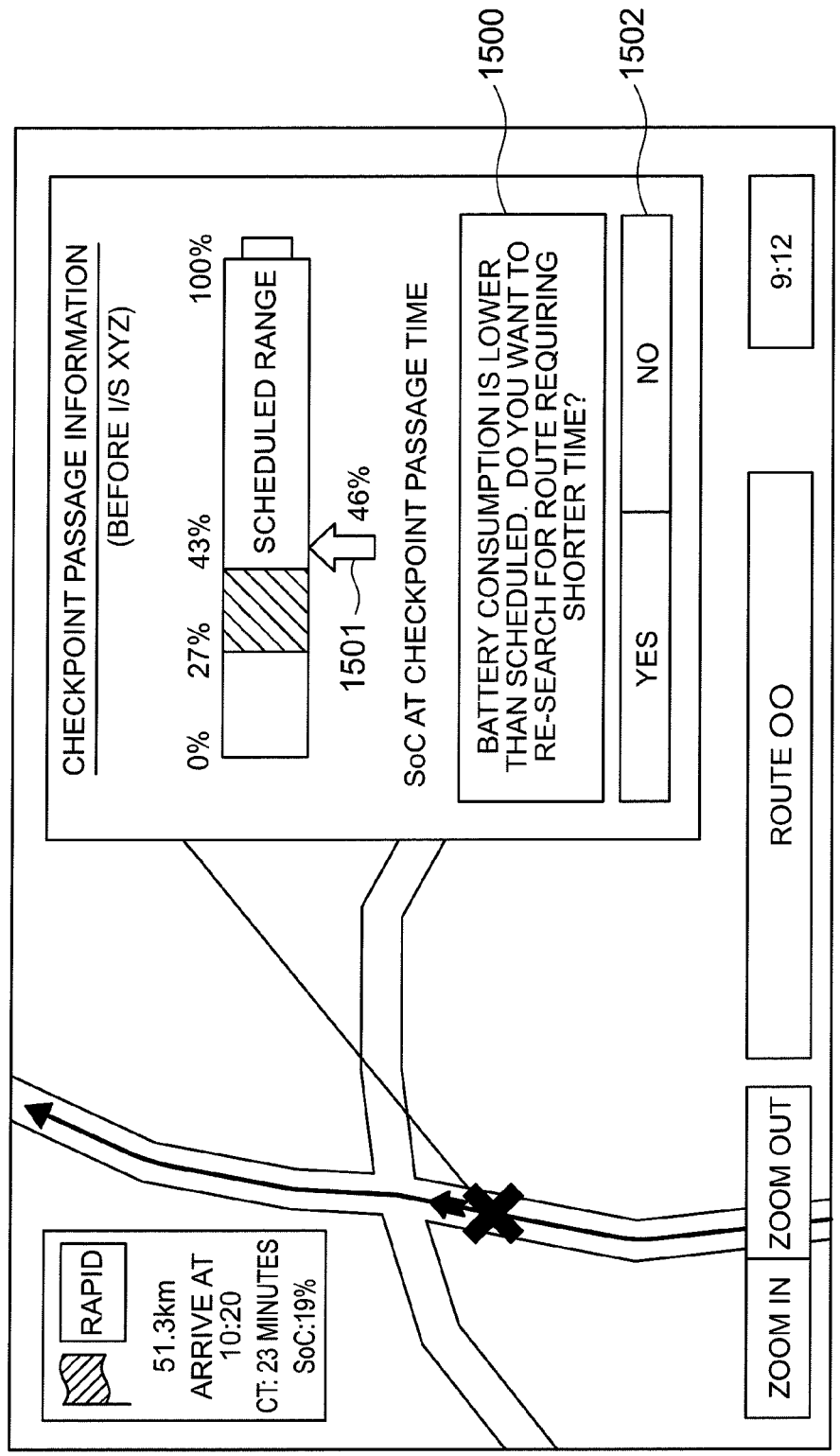
FIG. 15 is a diagram showing an example of the screen configuration on the output device of the display terminal.

It is also possible that the screen for determining whether to perform a route research, such as the one shown later in FIG. 15, is displayed and, when the user selects to perform re-search, the display terminal 101 performs research.

FIG. 15 is a diagram showing an example of the navigation screen of the navigation system for an electric vehicle that is displayed on the output device 304 of the display terminal 101.

FIG. 15 shows the navigation screen that is displayed when the confirmation-point remaining battery capacity at a checkpoint-passage time is larger than the estimated remaining battery capacity band at the checkpoint. In addition to the items shown in FIG. 12, the message, which indicates that the remaining battery capacity at a checkpoint-passage time is larger than the remaining battery capacity band, is displayed in an area 1500 where a message about the checkpoint passage is displayed. An image 1501 that indicates the confirmation-point remaining battery capacity, which is the actual measurement value at checkpoint passage time, is also displayed. In addition, because eco-driving is performed more smoothly than expected in the route search result, the message is displayed in the area 1500, indicating that a route, which requires a traveling time (including the charging time) shorter than that in the route search result at the starting point, may be searched for. The user, who browses the area 1500, selects "Yes" or "No" displayed in an area 1502 to indicate whether to perform re-search. If "Yes" is selected, the display terminal 101 performs route research.

It is also possible that, instead of outputting an option to select an option to perform re-search, it is also possible that the display terminal 101 unconditionally sends, or does not send, a route re-search request to the telematics center 100.

Figure 16:
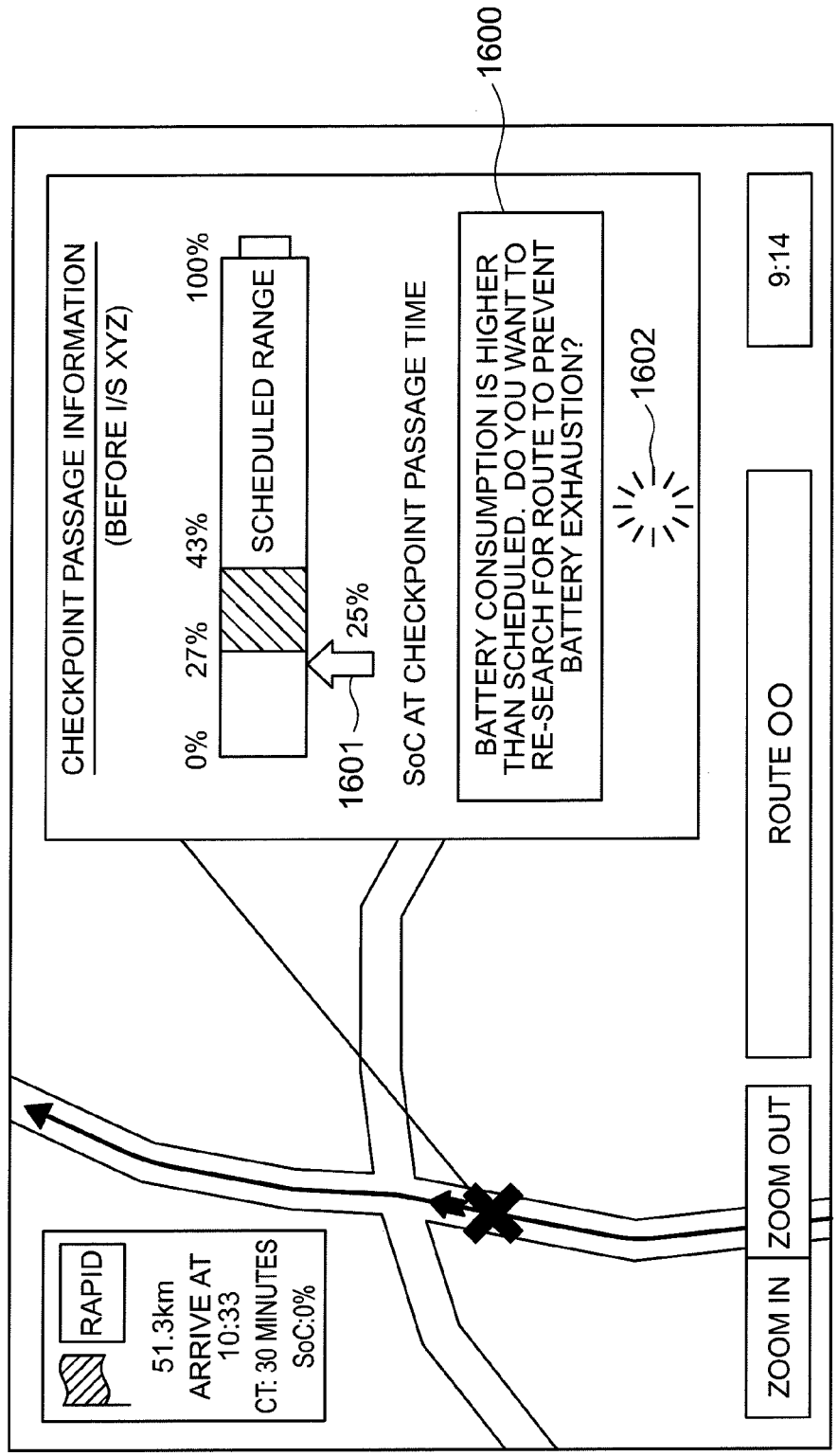
FIG. 16 is a diagram showing an example of the screen configuration on the output device of the display terminal.

FIG. 16 is a diagram showing an example of the navigation screen of the navigation system for an electric vehicle that is displayed on the output device 304 of the display terminal 101.

FIG. 16 shows the navigation screen that is displayed when the confirmation-point remaining battery capacity at a checkpoint-passage time is smaller than the estimated remaining battery capacity band at the checkpoint. In addition to the items shown in FIG. 13, the message, which indicates that the remaining battery capacity at a checkpoint-passage time is smaller than the remaining battery capacity band, is displayed in an area 1600 where a message about the checkpoint passage is displayed. An image 1601 that indicates the confirmation-point remaining battery capacity, which is the actual measurement value at checkpoint passage time, is also displayed. In addition, because eco-driving is not performed as assumed in the route search result, battery exhaustion may occur before the vehicle travels to the destination, a transit point, or a transit charging station if the traveling continues according to the route search result at the starting point. Therefore, the display terminal 101 performs the route re-search and displays an image 1602 that indicates that the route re-search is performed.

As in the area 1502 in FIG. 15, an option to select whether to perform the research for an optima route may also be displayed to prevent the battery exhaustion.

According to this embodiment, the user who is traveling in an electric vehicle can easily determine whether the vehicle traveling state (current remaining battery capacity) is better than the route search result calculated by the telematics center. In addition, the user can identify where the current remaining battery capacity stands in the remaining battery capacity band at a checkpoint. Therefore, even if the route re-search is performed to prevent battery exhaustion, this ability allows the user to easily guess the cause, thus reducing the worry during the navigation.

Another embodiment of a navigation system for an electric vehicle is described below. Instead of the method in which the confirmation position coordinates are set at a regular interval based on the time or the distance such as that described in FIG. 9, the method described below with reference to FIG. 17 may also be used as a method for determining the confirmation position coordinates of checkpoint information that are added to the route search information. More specifically, in FIG. 17, the shortest route search is performed first based on the current remaining battery capacity in the same way as in S908 (S1700).

Next, the shortest route search unit 212 sets n to 1 to initialize the checkpoint number (S1701) and then, for the actual remaining battery capacity R used in the route search in S1700, performs the shortest route search by setting the remaining battery capacity to $R \times (1-n/T)$ (S1702). The value of the integer T, for which an appropriate value is set by the server, may also be specified by the user when issuing a route search request. The shortest route search unit 212 compares the route search result, calculated in S1702, with the route search result when the remaining battery capacity is $R \times (1-(n+1)/T)$ to derive a point at which the route search results do not match, that is, derives a junction intersection on the route (S1703). After identifying the road link ID 710 of the link before the vehicle enters the junction intersection, the shortest route search unit 212 determines the remaining battery capacity band at the checkpoint in the same manner as in S903 to S905 (S1704). After the derivation of the n-th checkpoint information is completed, the shortest route search unit 212 adds 1 to n (S1705) and checks if n is smaller than the integer T to determine whether the next checkpoint is to be derived (S1706). If n is smaller than T (S1706: YES), the shortest route search unit 212 re-executes the processing beginning at S1702 to generate the next checkpoint information. If n is equal to or larger than T, the shortest route search unit 212 includes the extracted (n−1) pieces of checkpoint information in the route search result and terminates the processing (S1707).

For example, when T is set to 10 in the method described above, the remaining battery capacity at the starting point becomes 0.9 times, 0.8 times, ..., 0.1 times of the actual value and, according to this change, the transit charging station the vehicle is to visit may be changed to a new transit charging station. In such a case, the method described above allows a confirmation point to be determined by setting the point of route switching to the position of the new transit charging station as a checkpoint.

Although the 1.0 times or less of the remaining battery capacity is used in S1702, 1.0 times or more of the remaining battery capacity may also be used.

The expression of the remaining battery capacity in S1702 may be an expression that changes based, not on the multiplication factor of the remaining battery capacity, but on the battery capacity. More specifically, the expression for determining the remaining battery capacity according to n may be as follows:

$$R - C^*(1-n/T) \text{ or } R + C^*(1-n/T)$$

where C is the battery capacity of the electric vehicle.

The checkpoint information to be included in the route search result may be not only the information extracted in S1700 to S1706 but also a combination of a part or all of the checkpoints extracted in S900 to S907.

Figure 17:
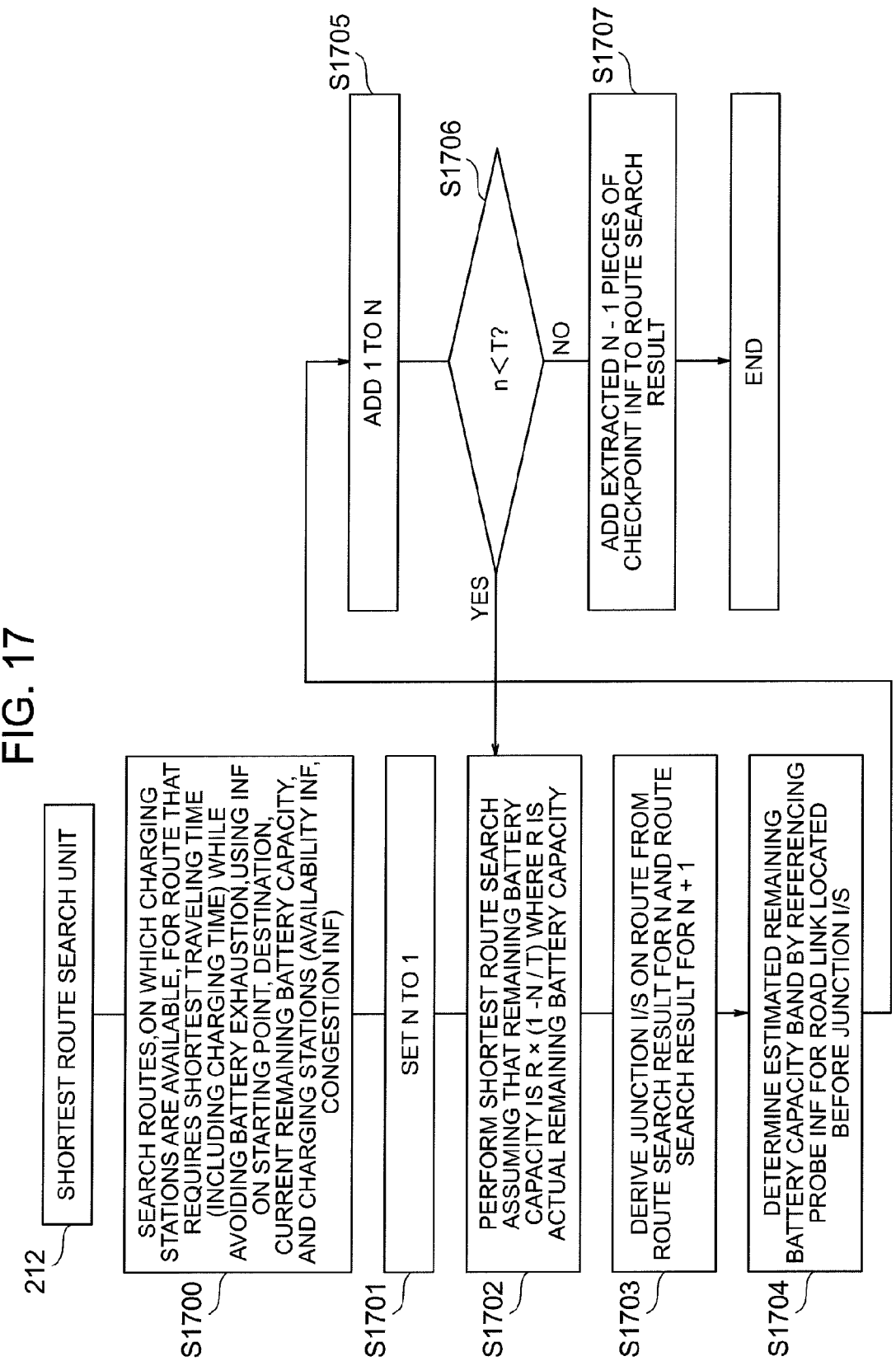
FIG. 17 is a diagram showing an example of a flowchart of the route search processing at the telematics center.
Figure 18:
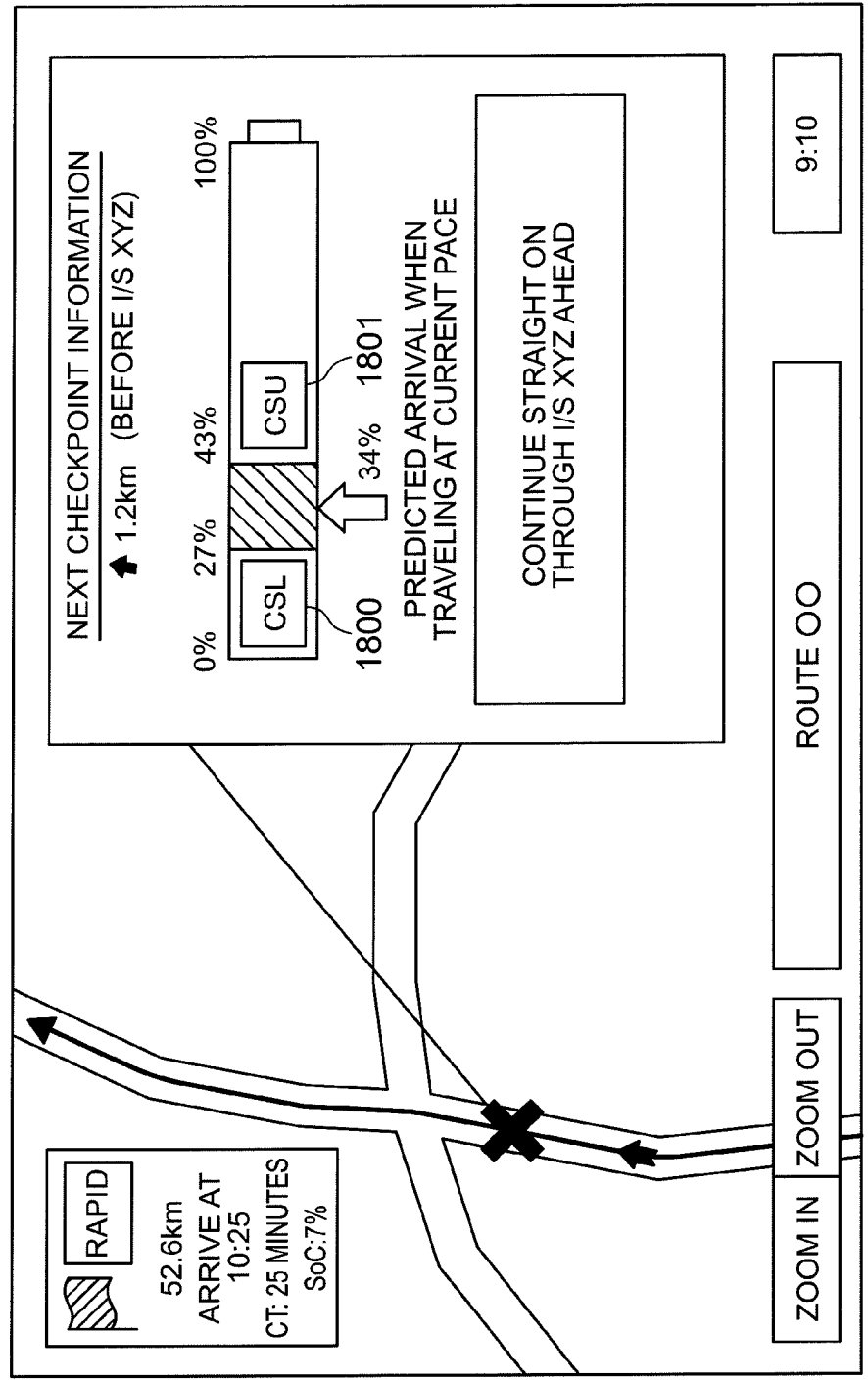
FIG. 18 is a diagram showing an example of the screen configuration on the output device of the display terminal.

FIG. 18 is a diagram showing an example of the navigation screen of the navigation system for an electric vehicle that is displayed on the output device 304 of the display terminal 101 according to the checkpoint confirmation-point coordinate determination method shown in FIG. 17.

In addition to the items on the screen shown in FIG. 13, the screen shown in FIG. 18 includes the two additional images 1800 (CSL) and 1801 (CSU). The image 1800 indicates the identifier of a transit charging station that the vehicle is to visit due to a change in the route when the remaining battery capacity is smaller than the remaining battery capacity band, and the image 1801 indicates the identifier of a transit charging station that the vehicle is to visit due to a change in the route when the remaining battery capacity is larger than the remaining battery capacity band. This information allows the user to confirm whether the vehicle is currently traveling at the battery consumption pace assumed by the route search result and, in addition, to reference the information on a new transit charging station information based on the assumption that the battery consumption pace is higher than expected or the user has been performing eco-driving more efficiently than expected, thus reducing the worry about a sudden changed in the route.

The screen may be configured in such a way that, when the user touches the image 1800 or the image 1801, the position information, availability information, and near-by facility information on the charging station are displayed. It is also possible to display an option, which allows the user to change the route to a route on which the charging station is included, and to request the telematics center 100 to perform the route search again when the user selects to change the route.

The information may be displayed, next to the image 1800 and the image 1801, to indicate how the total traveling time (including the charging time) will change when the route is changed to a route including the charging station.

In another embodiment of the route search system for an electric vehicle, the display terminal 101 may have the function of the telematics center 100, in which case the display terminal 101 performs the route search and displays the route search result on the output device 304 by sending an information request directly to the electric vehicle 102 or the charging station 103. The display terminal 101 may also perform all processing within itself by receiving the information on the electric vehicle 102 and the charging station 103 via the input device 303.

In still another embodiment of the route search system for an electric vehicle, the display terminal 101 may be integrated into the electric vehicle 102 in which case the electric vehicle 102 has the function of the display terminal 101. In this case, a device such as a car navigation device may be used in place of the display terminal 101.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A navigation system for an electric vehicle, said navigation system comprising a display terminal that sends and receives information to and from an electric vehicle over a network; and a server that sends and receives information to and from said display terminal over the network, wherein said display terminal performs processing for sending a search request for a route, via which said electric vehicle moves from a starting point to a destination, to the server, the search request including position coordinates of the starting point, position coordinates of the destination, a remaining battery capacity, a battery capacity, and a start time;

processing for displaying route guidance information on an output device, the route guidance information sent from said server, the route guidance information created based on a route search result that includes one or more pieces of base point information;

processing for displaying, on said output device, a result of comparison between an estimated remaining battery capacity which indicates a band including a maximum value and a minimum value of a remaining battery capacity, which is assumed when the electric vehicle passes a battery state confirmation point, which is included in one of the pieces of the base point information, with a confirmation-point remaining battery capacity of said electric vehicle at the confirmation point; and processing for requesting said server to perform a route re-search according to whether the confirmation-point remaining battery capacity when the electric vehicle passes the confirmation point becomes smaller than the minimum value of the band or larger than the maximum value of the band, and said server performs processing for searching for a route, via which said electric vehicle moves from the starting point to the destination without battery exhaustion, in response to the route search request or the route re-search request from said display terminal;

processing for calculating the range of the estimated remaining battery capacity including the maximum value and the minimum value to be included in the base point information;

processing for deriving one or more pieces of the base point information on the searched-for route and for adding the derived base point information to the route search result, said base point information including position information on the confirmation point and the estimated remaining battery capacity at the confirmation point; and processing for sending the route search result, which includes the derived base point information, to the display terminal.

2. The navigation system for an electric vehicle according to claim 1, wherein said server performs processing for setting a position on the searched-for route as the confirmation point, the position being dependent on a time, a distance, a power consumption, or intersection point information.

3. The navigation system for an electric vehicle according to claim 1, wherein said server further performs processing for calculating the band of a remaining battery capacity, which is assumed when the electric vehicle passes the point, as the base point information using travel history of the electric vehicle and other electric vehicles that have passed the base point position.

4. The navigation system for an electric vehicle according to claim 1, wherein said server performs processing for searching for a plurality of routes, on each of which a charging station is available and the electric vehicle can travel from the starting point to the destination without battery exhaustion, in the route search processing in which a plurality of remaining battery capacities are set; and processing for deriving a junction point for two route search results whose remaining battery capacity levels are closest to each other and, with the point as a base point, calculating base point information, which includes position information, estimated remaining battery capacity at the point, and information on a new transit charging station when the route is changed, and for adding the calculation result to the route search result, the junction point being a point used to classify the route into a part where the route is common and a part where the route is not common and said display terminal performs processing for displaying, during route guidance, a current-position remaining battery capacity of said electric vehicle that is moving, the base point information included in the route search result, and the information on a new transit charging station when the route is changed.

5. The navigation system for an electric vehicle according to claim 1, wherein said server further performs processing for deriving the confirmation point based on a time, a distance, a power consumption, or position information on an intersection.

6. A display terminal that sends and receives information to and from an electric vehicle over a network, said display terminal performing:

processing for managing by associating a position, a type, and an output power of a charging station with an identifier that can uniquely identify the charging station;

processing for managing road information for use in a route search;

processing for searching for a route via which the electric vehicle moves from a starting point to a destination without battery exhaustion based on acquired position coordinates of the starting point, position coordinates of the destination, a remaining battery capacity, a battery capacity, and a start time;

processing for setting a position on a searched-for route as a battery state confirmation point, the position being dependent on a time, a distance, a power consumption, or position information on an intersection, and for calculating a band including a maximum value and a minimum value of a remaining battery capacity, which is assumed when the electric vehicle passes the confirmation point, as the estimated remaining battery capacity;

processing for deriving one or more pieces of base point information that includes position information on the confirmation point and a confirmation-point remaining battery capacity at the point; and processing for confirming a remaining battery capacity of the electric vehicle and for displaying, on a output device, a result of comparison between an estimated remaining battery capacity at the confirmation point included in one of the pieces of the base point information and a confirmation-point remaining battery capacity of the electric vehicle at the confirmation point; and processing for performing the route re-search processing according to whether the confirmation-point remaining battery capacity when the electric vehicle passes the confirmation point becomes smaller than the minimum value of the band or becomes larger than the maximum value of the band.

7. The display terminal according to claim 6 wherein said display terminal further performs processing for deriving the confirmation point based on a time, a distance, a power consumption, or position information on an intersection.

* * * * *